United States Patent
Cartaya

(10) Patent No.: US 9,749,317 B2
(45) Date of Patent: Aug. 29, 2017

(54) NULLIFYING BIOMETRICS

(71) Applicant: AT&T Intellectual Property I, L.P., Atlanta, GA (US)

(72) Inventor: Julio A. Cartaya, Tinton Falls, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 6 days.

(21) Appl. No.: 14/838,656

(22) Filed: Aug. 28, 2015

(65) Prior Publication Data

US 2017/0063850 A1    Mar. 2, 2017

(51) Int. Cl.
*H04L 29/06* (2006.01)
*G06F 21/32* (2013.01)

(52) U.S. Cl.
CPC .......... *H04L 63/0861* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 5,878,155 A | 3/1999 | Heeter | |
| 7,254,619 B2 | 8/2007 | Mekata et al. | |
| 7,697,735 B2 | 4/2010 | Adam et al. | |
| 8,565,494 B2 | 10/2013 | Fukuda et al. | |
| 8,593,672 B2 | 11/2013 | Aoyama et al. | |
| 8,862,890 B2 | 10/2014 | Kamakura | |
| 9,082,048 B2 | 7/2015 | Miller | |
| 2003/0154382 A1* | 8/2003 | Vicard | G07C 9/00087 713/186 |
| 2013/0188842 A1 | 7/2013 | Hauke | |
| 2013/0216095 A1 | 8/2013 | Yabuki | |
| 2013/0279770 A1* | 10/2013 | Abe | G06K 9/00087 382/124 |
| 2014/0016833 A1* | 1/2014 | Ide | G06K 9/00885 382/115 |
| 2015/0033305 A1* | 1/2015 | Shear | G06F 21/45 726/6 |
| 2015/0059003 A1* | 2/2015 | Bouse | G06F 21/31 726/28 |
| 2015/0063664 A1 | 3/2015 | Endoh et al. | |
| 2015/0193669 A1 | 7/2015 | Gu et al. | |

(Continued)

FOREIGN PATENT DOCUMENTS

JP   4749017 B2   8/2011
KR   101238687 B1   3/2013

OTHER PUBLICATIONS

Jang, Wonjun, et al. "User-Oriented Pseudo Biometric Image Based. One-Time Password Mechanism on Smart Phone." *Information Security and Assurance*. Springer Berlin Heidelberg, 2011. 395-404.

(Continued)

*Primary Examiner* — Christopher Revak
(74) *Attorney, Agent, or Firm* — Scott P. Zimmerman, PLLC

(57) ABSTRACT

Artificial biometric traits self-nullify due to natural physiological processes. Biometric enrollment and authentication may then be based on a life associated with the self-nullifying biometric trait. Once the life is expected to have expired, no further authentication may be performed until a new artificial biometric is applied.

20 Claims, 25 Drawing Sheets

(56) References Cited

U.S. PATENT DOCUMENTS

2015/0213352 A1 7/2015 Niedermann
2015/0254912 A1* 9/2015 Weisman ............ G06Q 50/265
                                                                705/325

OTHER PUBLICATIONS

Breebaart, Jeroen, et al. "A Reference Architecture for Biometric Template Protection based on Pseudo Identities." *BIOSIG* 2008 (2008): 25-37.

* cited by examiner

FIG. 10

| Alphanumeric Combination | Name | Address | Enrollment Image | Timestamp | Growth Rate | Expiration Time | Life |
|---|---|---|---|---|---|---|---|
| 5d8fa45x65v | Mary | Address1 | Barcode | T1 | Rate1 | ET1 | Life1 |
| 41as8ds41vd | Bob | Address2 | QR Code | T2 | Rate2 | ET2 | Life2 |
| 7we5h4jkgfs | Nancy | Address3 | Pattern | T3 | Rate3 | ET3 | Life3 |
| d8ssadtl1289 | Joe | Address4 | Composite | T4 | Rate4 | ET4 | Life4 |

FIG. 11

| Alphanumeric Combination | Name | Address | Enrollment Image | Timestamp | Growth Rate | Expiration Time | Life | Body Location |
|---|---|---|---|---|---|---|---|---|
| 5d8fa45x65v | Mary | Address1 | Barcode | T1 | Rate1 | ET1 | Life1 | Nail Plate |
| 4las8ds4lvd | Bob | Address2 | QR Code | T2 | Rate2 | ET2 | Life2 | Hand |
| 7we5h4jkgfs | Nancy | Address3 | Pattern | T3 | Rate3 | ET3 | Life3 | Hair |
| d8ssadtl1289 | Joe | Address4 | Composite | T4 | Rate4 | ET4 | Life4 | Fingerprint |

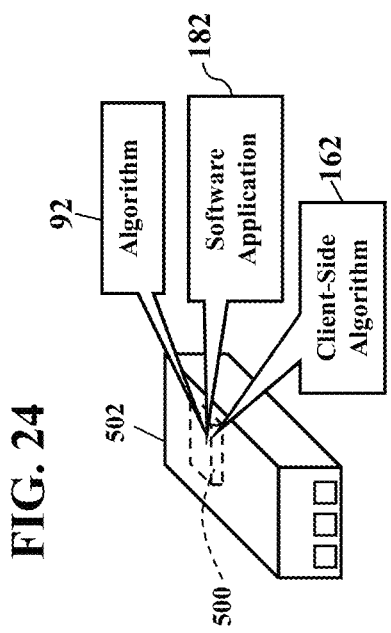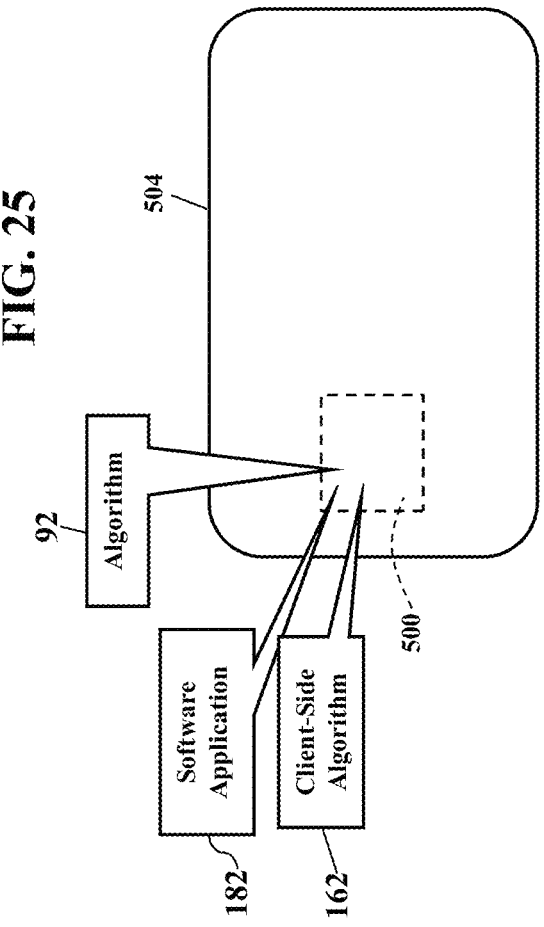

NULLIFYING BIOMETRICS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Secure authentication is troublesome. Conventional passwords are easily forgotten and easily compromised. Biometric identifiers need not be memorized, but biometric identifiers are non-modifiable and permanent. Moreover, conventional biometric identifiers are prone to recognition failures.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 9-10 illustrate automatic expiration of enrollment, according to exemplary embodiments;

FIG. 11 further illustrates the enrollment database, according to exemplary embodiments;

FIGS. 21-26 depict still more operating environments for additional aspects of the exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
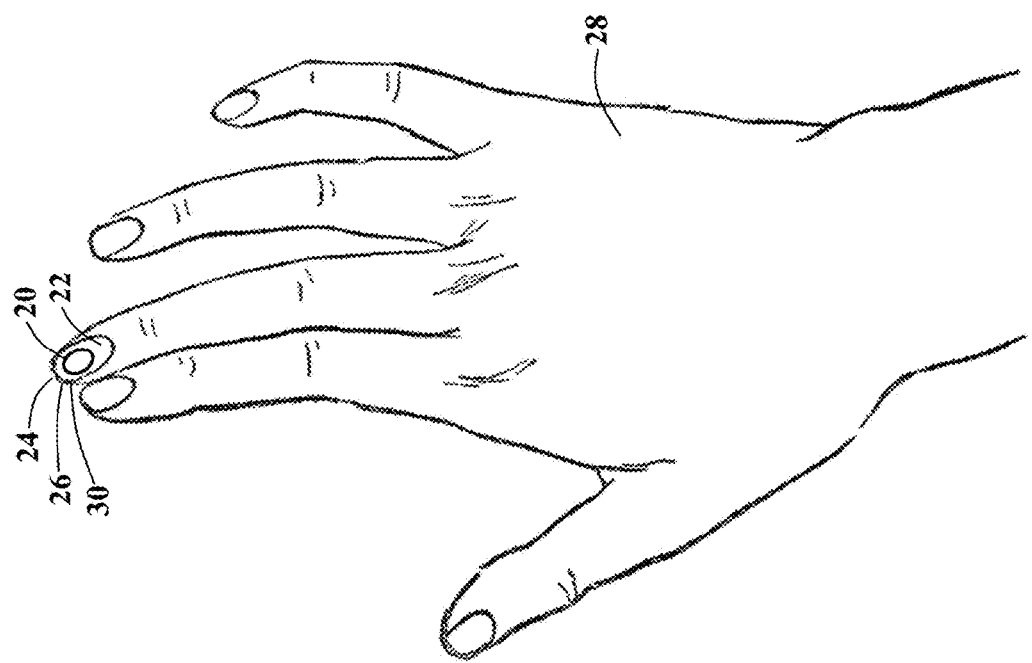
FIGS. 1-6 are illustrations of a nullifying biometric, according to exemplary embodiments.
Figure 2:
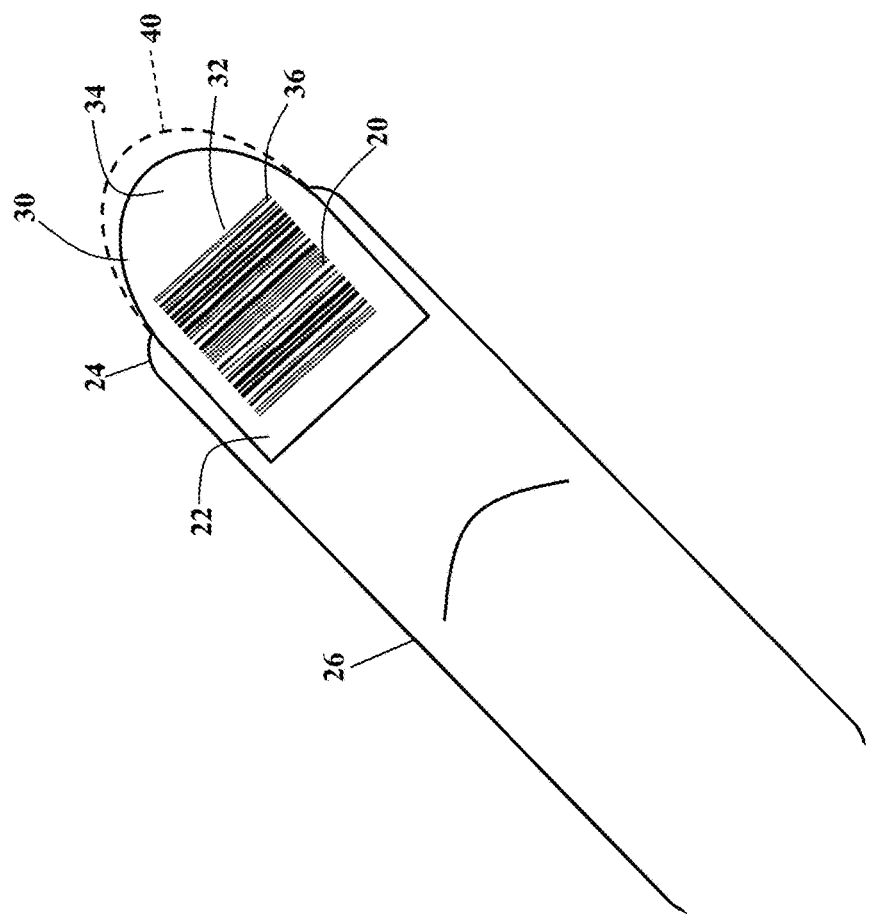

FIGS. 1-2 are illustrations of a nullifying biometric 20, according to exemplary embodiments. The nullifying biometric 20 is an artificial biometric trait that nullifies over time as a consequence of natural physiological processes in the human body. FIG. 1, for example, illustrates a nail plate 22 covering a tip 24 of a finger 26 of a human hand 28. The nail plate 22 is commonly known as the fingernail 30. As FIG. 2 better illustrates, a marking 32 is engraved into, or applied onto, an upper or outer surface 34 of the nail plate 22. The marking 32 is illustrated as a barcode 36 that may be scanned and/or machine read (as later paragraphs will explain) to uniquely confirm an identity of a user.

The nullifying biometric 20 is ephemeral. As the nail plate 22 physiologically grows, the marking 32 naturally moves toward the tip 24 of the finger 26. Eventually the marking 32 moves to a distal end and is cut or trimmed away. Research shows that an epidermis of the nail plate 22 has an average growth rate 40 of about three millimeters (3 mm) in length per month, depending on many factors (e.g., age, sex, season, exercise level, and diet). Within weeks or a few months, then, the nail plate 22 is trimmed in length. The marking 32 is thus eventually mutilated, destroyed, or discarded in time.

The nullifying biometric 20 may thus be a temporary body modification. The marking 32 combines the best features of both passwords and biometrics. Passwords are easy to generate, easy to enroll, easy to verify, and easy to cancel. Biometrics are very easy to use and do not require memorization. The nullifying biometric 20 thus combines these features to create a body modification that is easily interpreted as a symbol (thus avoiding recognition failures) and that does not require memorization. Moreover, the nullifying biometric 20 disappears by itself as a consequence of natural physiological processes. The nullifying biometric 20, in other words, will cancel itself with human physiological growth. Exemplary embodiments thus overcome the permanence issues with conventional biometrics and yet still prove secure enough to replace passwords.

The nullifying biometric 20 is subtle. When the marking 32 is engraved into, or adhered to, the nail plate 22, the nullifying biometric 20 is nearly unnoticeable. The nullifying biometric 20 has little or no effect on clothing, cosmetics, and movement. Indeed, the marking 32 may even be painted (similar to nail polish coatings), as long as the marking 32 is still machine discernable. The nullifying biometric 20 is simply unobtrusive with fashion and athletics.

The nullifying biometric 20 is preferably symbolic. FIG. 2 illustrates the marking 32 as the symbolic barcode 36 that may be uniquely associated with the authenticating user. The marking 32, however, may be a quick response ("QR") code or any other machine-readable symbol or pattern that is optically associated with an enrolling user (e.g., an "enrollee"). When the enrollee places her finger 26 into or onto an imaging device, an image or scan of the marking 32 may be captured, interpreted, and associated with the enrollee. The nullifying biometric 20 may thus be a symbolic pattern that is authenticated with less noise and distortion. As the reader may understand, conventional biometric authentication schemes are essentially analog and must be measured and quantized into discrete values before being processed by any cryptographic function. Measurement errors are common, and even minor changes at an input of a cryptographic function are amplified. Hence, the comparison of measured data with reference data cannot be executed in the encrypted domain without prior precautions to contain the effect of noise. Conventional biometric authentication schemes must therefore constantly balance error rates due to false acceptances and false rejections. Exemplary embodiments, instead, use the machine-readable marking 32 that reduces error rates.

Figure 3:
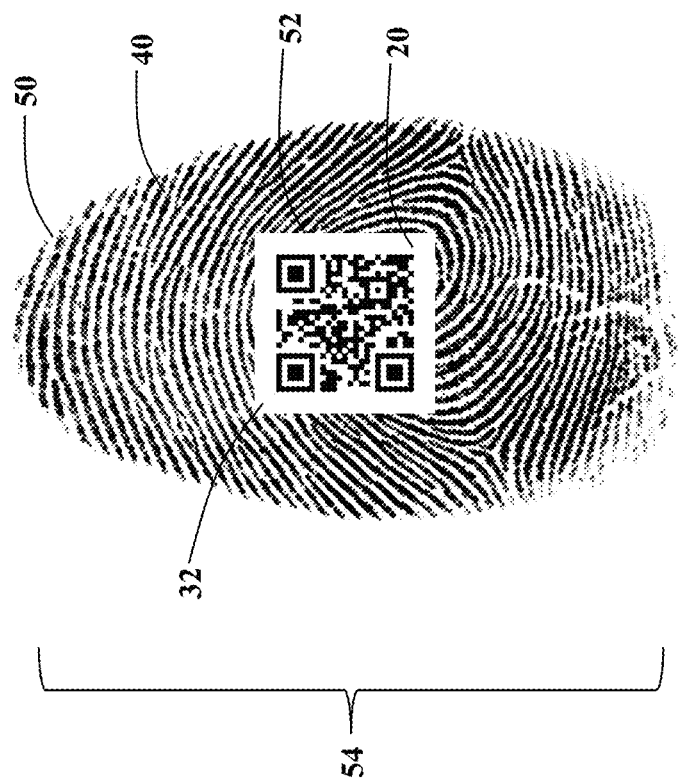

FIG. 3 further illustrates the nullifying biometric 20, according to exemplary embodiments. Here the nullifying biometric 20 is illustrated as the marking 32 carved into a fingerprint 50. FIG. 3 is an enlarged illustration for clarity of features. As the reader understands, the human finger (illustrated as reference numeral 26 in FIGS. 1-2) has an area of epidermal ridges commonly referred to as the fingerprint 50. Even though the fingerprint 50 is unique to the enrolling/authenticating individual, fingerprint recognition is difficult and prone to failure. Here, though, the fingerprint 50 may be augmented with the marking 32. The marking 32 is illustrated as a quick response ("QR") code 52 that is applied to or overlaid onto the fingerprint 50. For example, the QR code 52 may be applied using laser emission. However, the QR code 52 may also be painted onto or adhesively applied to the fingerprint 50. Regardless, the marking 32 may be any machine-readable pattern that is combined with the fingerprint 50.

Again, the nullifying biometric 20 is ephemeral. Laser emission heats and destroys cellular layers of the epidermis of the skin. As the skin physiologically repairs and heals, the marking 32 will thus gradually disappear as new skin cells replace destroyed skin cells. The nullifying biometric 20, in other words, will naturally cancel as new skin cells are generated. In time, then, the marking 32 self-erases or fades according to a cellular growth rate 40. Because the nullifying biometric 20 is transient, the nullifying biometric 20 is again a temporary body modification. The nullifying biometric 20 is easy to use, does not require memorization, and is machine-readable. However, the nullifying biometric 20 is only temporary and naturally cancels itself in time. Again, then, the nullifying biometric 20 combines the best features of both passwords and biometrics.

Exemplary embodiments may thus be multimodal. Unimodal biometrics uses a single biometric indicator (such as the fingerprint 50) to authenticate the user. However, unimodal biometric authentication is easy to spoof Here, though, exemplary embodiments create a multimodal scheme that only uses a single biometric input source. The QR code 52 laser carved into the fingerprint 50 forms a composite biometric indicator 54. A single optical scan or image of the composite biometric indicator 54 may yield two (2) different biometric traits. That is, enrollment and authentication may independently and separately analyze the visible fingerprint 50 and the QR code 52. However, exemplary embodiments may instead analyze the composite biometric indicator 54. Regardless, exemplary embodiments may fuse the two (2) different biometric traits to verify an identity of the user.

Figure 4:
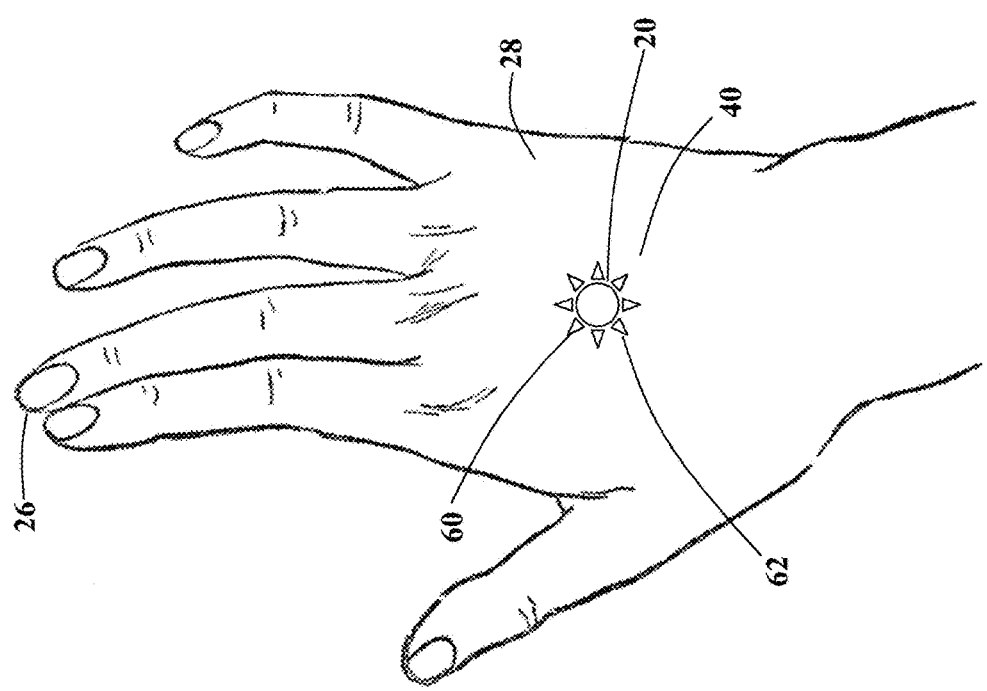

FIG. 4 is yet another illustration of the nullifying biometric 20, according to exemplary embodiments. Here the nullifying biometric 20 is illustrated as a superficial tattoo 60 applied to the human hand 28. The nullifying biometric 20 may again be heat carved into the hand 28 using laser emission. FIG. 4 illustrates the nullifying biometric 20 as a machine-readable pattern 62. As the skin of the hand 28 physiologically repairs and heals, the pattern 62 will thus gradually disappear as new skin cells replace destroyed skin cells. Again, then, the nullifying biometric 20 naturally cancels as new skin cells are generated according to the cellular growth rate 40. The nullifying biometric 20 is again a temporary body modification that self-erases or fades, eventually becoming unreadable. The nullifying biometric 20 is easy to use and does not require memorization, but is only temporary and naturally cancels itself in time. Again, then, the nullifying biometric 20 combines the best features of both passwords and biometrics.

The nullifying biometric 20 may have a pigment. Different wavelengths of the laser emission may cause cellular melanin to produce different cellular pigments. That is, the laser emission may cause damaged cells to change their pigment. The nullifying biometric 20 may thus have an initial cellular pigmentation that only reflects light of particular colors/wavelengths. For example, a wavelength of the excitation laser emission may thus be chosen such that the cellular melanin only reflects ultraviolet light. The laser emission, however, may be chosen to ensure the nullifying biometric 20 is only machine readable, and/or humanly visible, at chosen wavelengths of incident light. As the skin physiologically renews, the nullifying biometric 20 will thus gradually disappear due to healing processes.

Figure 5:
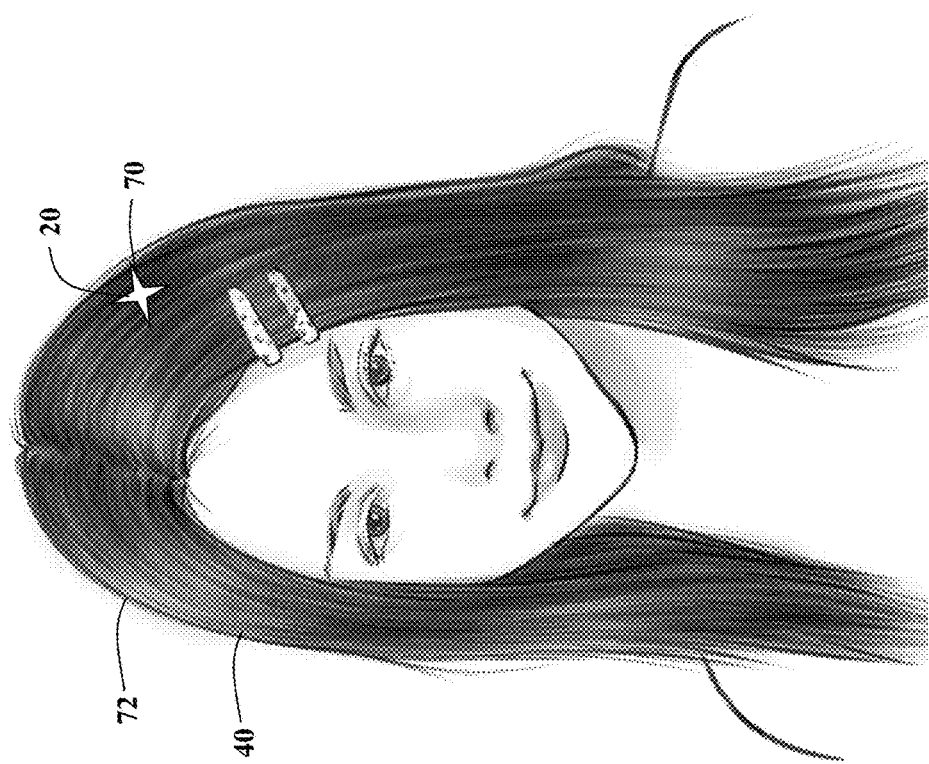
Figure 6:
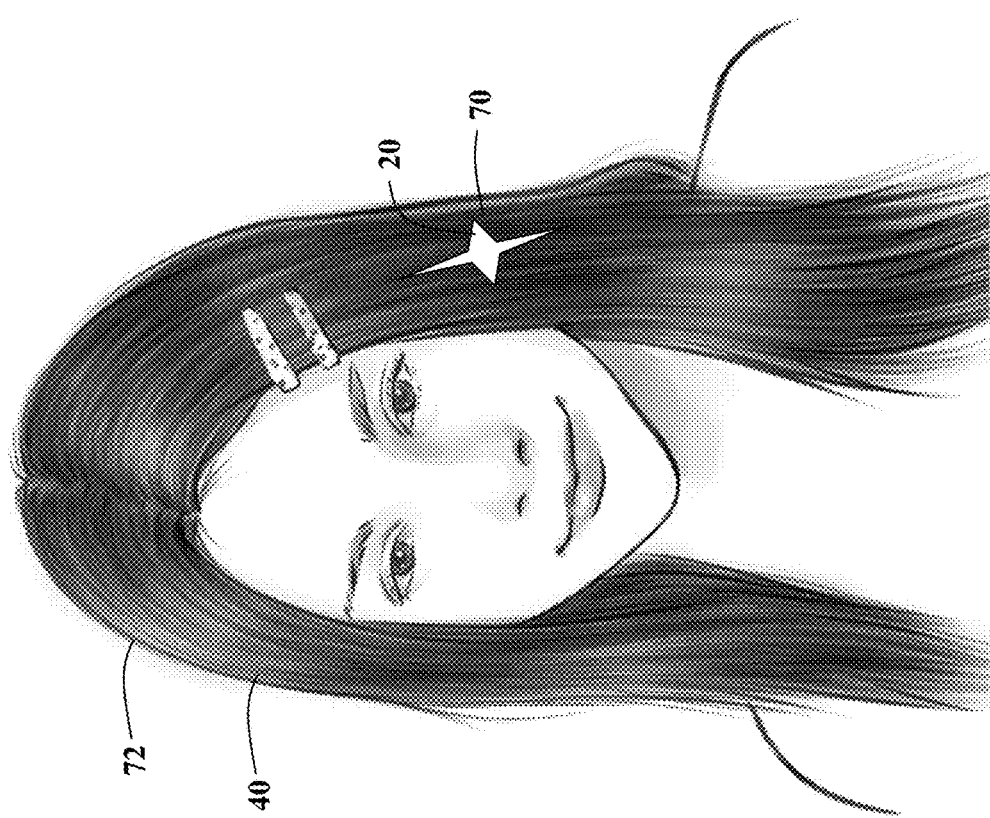

FIGS. 5-6 further illustrate the nullifying biometric 20, according to exemplary embodiments. Here the nullifying biometric 20 is illustrated as a symbol 70 that is chemically dyed onto the enrollee's hair 72. The nullifying biometric 20 may again be machine-readable for biometric enrollment and verification/authorization. However, as the hair filaments physiologically grow, the symbol 70 will gradually move and distort. Indeed, in time most enrollees will trim or cut their hair 72, thus eventually discarding or destroying the symbol 70. Research shows that the hair 72 has an average growth rate 40 of about 1.25 centimeters in length per month. Within a few months or so, most people will have their hair 72 trimmed in length. The nullifying biometric 20 is thus eventually mutilated, destroyed, or discarded in time.

As FIG. 6 illustrates, the nullifying biometric 20 may also degrade with time. As the reader may understand, not all hair filaments grow at the same rate. Some hair filaments grow faster, while some hair filaments are dormant. Research has shown that the hair 72 has different stages of growth, and the individual hair filaments may have different stages. So, even if the hair 72 grows in length without trim, the symbol 70 may still become unreadable. That is, as the hair filaments grow in different stages, the symbol 70 will naturally distort over time. Some filaments will grow in length, while other filaments are stagnant and do not grow. Over time, then, different portions of the symbol 70 may move and even elongate, thus mutating the symbol 70. The nullifying biometric 20 may thus naturally move and change with the hair growth rate 40, eventually becoming unverifiable with the user.

The nullifying biometric 20 is thus the temporary body modification. As the hair 72 grows, most people will cut away the chemically-dyed nullifying biometric 20. Even if the hair 72 is permitted to grow, the nullifying biometric 20 will naturally move, distort, and mutate to a point of verification failure. That is, the symbol 70 will change with time, eventually no longer being readable or associable with the enrolled user. The nullifying biometric 20 thus again self-nullifies due to human physiological processes. The nullifying biometric 20 is easy to use and does not require memorization, but is only temporary and naturally cancels itself in time. Again, then, the nullifying biometric 20 combines the best features of both passwords and biometrics.

Exemplary embodiments thus present a secure authentication alternative. The nullifying biometric 20 is a synthetic or artificial biometric trait that is still easy to use and overcomes the permanence of conventional biometric traits. The body marking 32 is ephemeral, faint, and naturally fades or disappears due to normal human physiological processes. The nullifying biometric 20 may be subtle, inconspicuous, and confidential, thus reducing nefarious capture and use by threat or force. Its physiological duration is comparatively very short, especially compared with the permanence of traditional biometric traits. Users are thus unafraid of embracing the nullifying biometric 20 and unafraid of being "branded."

The nullifying biometric 20 thus voids with time. Conventional biometric traits (such as the fingerprint 50 and iris patterns) are permanent. Here, though, the nullifying biometric 20 revokes itself or self-nullifies in a relatively short amount of time. Natural physiological processes (whether healing or growth) may cause the nullifying biometric 20 to distort, to fade away, to change its position on the human body, and/or to be discarded.

Figure 7:
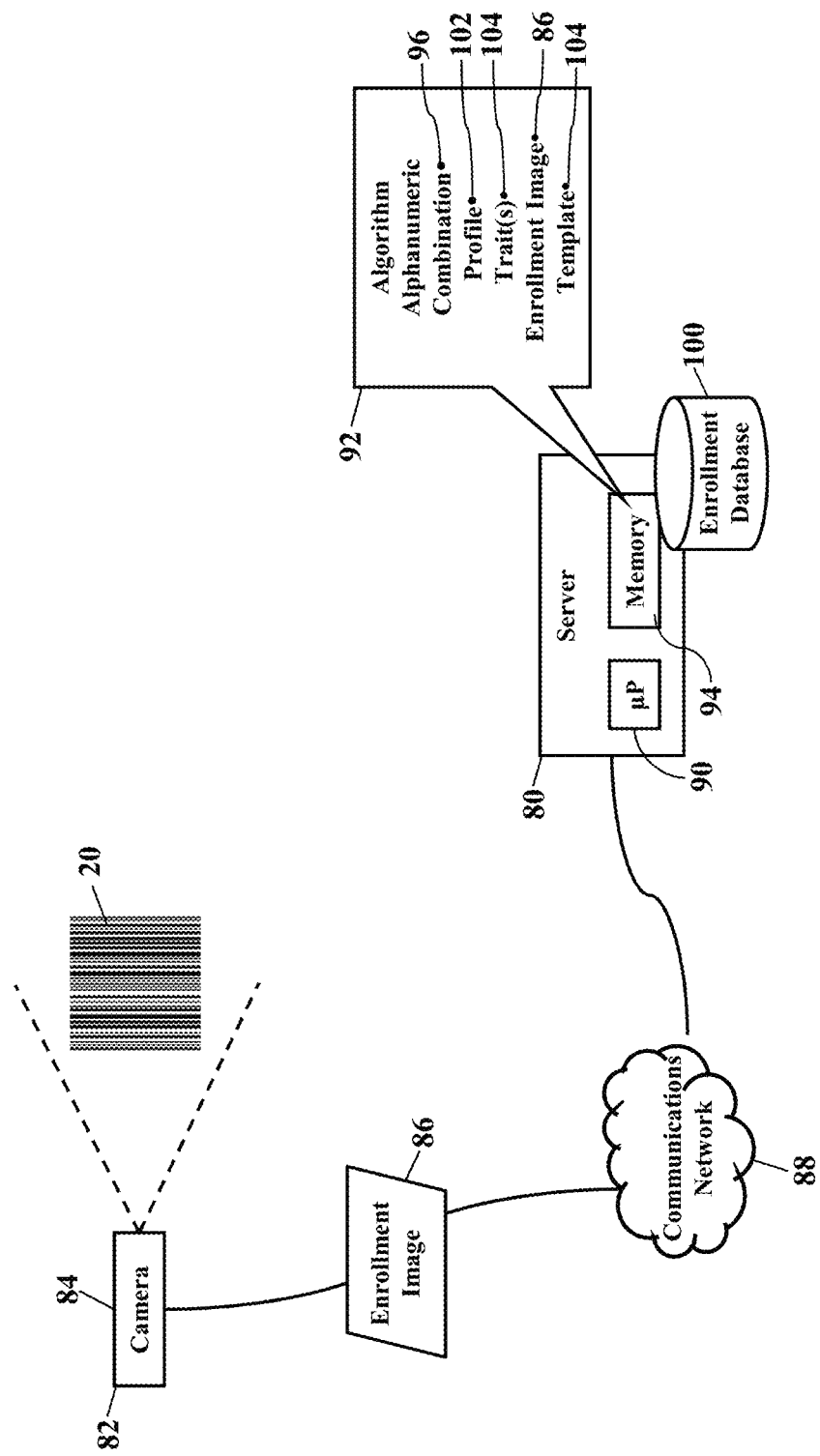
FIGS. 7-8 are detailed illustrations of an operating environment, according to exemplary embodiments.
Figure 8:
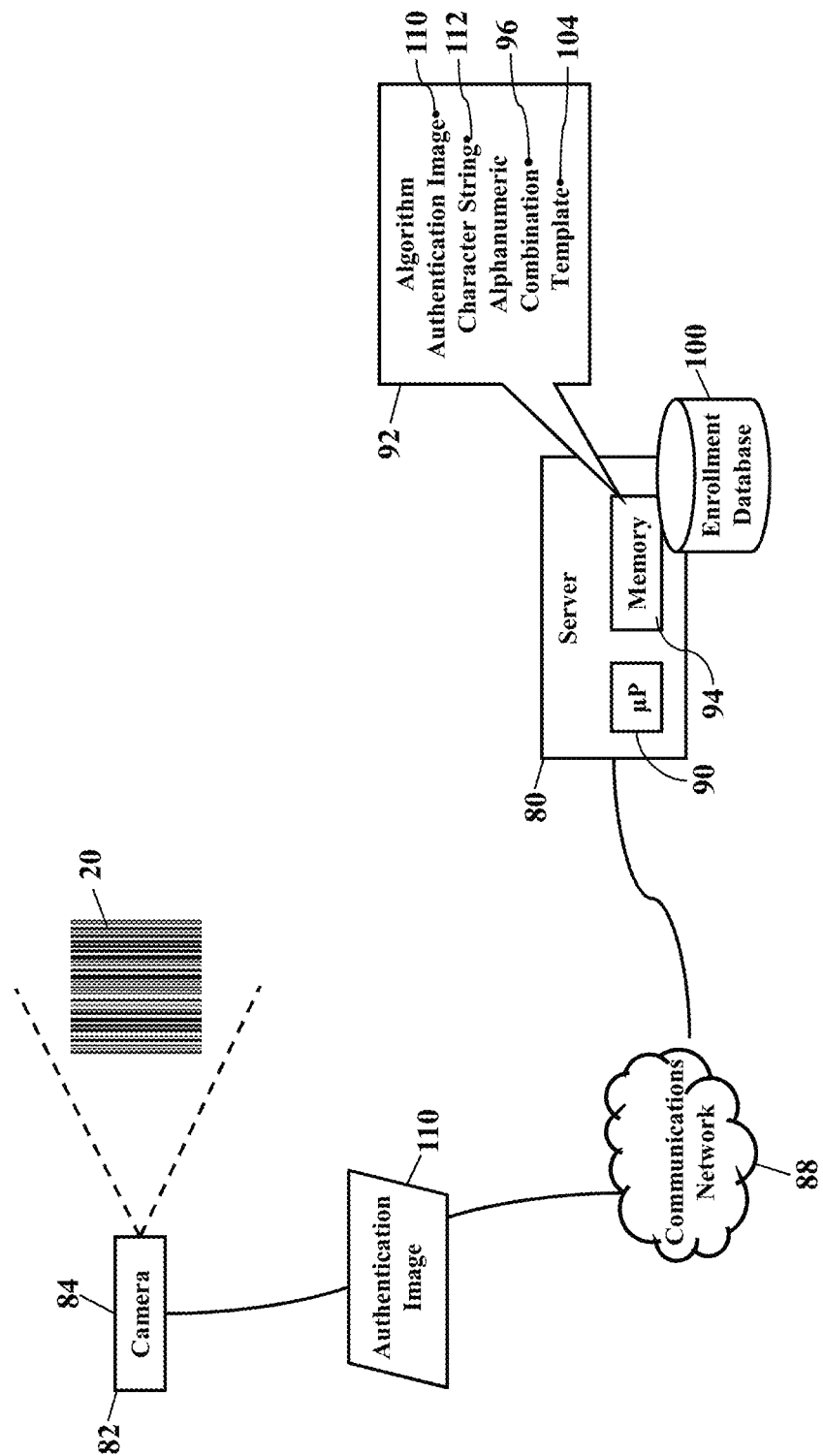

FIGS. 7-8 are detailed illustrations of an operating environment, according to exemplary embodiments. FIG. 7 illustrates a computer server 80 that manages enrollment associated with the nullifying biometric 20. Biometric enrollment is generally known, so this disclosure need not dwell on the known aspects. In general, though, the nullifying biometric 20 is sensed by some sensing device 82. For simplicity this disclosure will assume a digital camera 84 captures a digital enrollment image 86 of the nullifying biometric 20. The digital camera 84 is illustrated as remotely located, so the digital image 86 is sent via a communications network 88 to the network address associated with the server 80. The digital camera 84, however, may be directly connected to, or even a component of, the server 80. Regardless, the server 80 may have a processor 90 (e.g., "µP"), application specific integrated circuit (ASIC), or other component that executes an algorithm 92 stored in a local memory 94. The algorithm 92 includes instructions, code, and/or programs that analyze the enrollment image 86 to recognize the nullifying biometric 20. Recall that the nullifying biometric 20 is machine readable, so the algorithm 92 may instruct the processor 90 perform an image analysis to recognize the nullifying biometric 20 described or contained within the digital enrollment image 86. The processor 90, for example, may map or translate the enrollment image 86 of the nullifying biometric 20 into a unique alphanumeric combination 96 (such as an electronic text string or message, which is well known and need not be discussed).

An enrollment database 100 is then consulted. Once the nullifying biometric 20 is recognized, the algorithm 92 instructs the processor 90 to add one or more database entries to the enrollment database 100. The enrollment database 100 stores or contains electronic database associations between different enrollment profiles 102 and their corresponding biometric traits 104. Each enrollment profile 102 is uniquely identified by the corresponding alphanumeric combination 96 that maps to the enrollment image 86 of the nullifying biometric 20 of the enrollee. Here, then, exemplary embodiments may store one or more electronic database associations between the alphanumeric combination 96 and the nullifying biometric 20 recognized in the digital enrollment image 86. The enrollment profile 102 may thus be used as a template 104 for authentication and verification processes.

FIG. 8 illustrates authentication. When verification of an identity is needed, the digital camera 84 captures an authentication image 110 of the credentials submitted by the authenticating user. Authentication is well known and need not be described in detail. The authentication image 110 is sent via the communications network 88 to the network address associated with the server 80. The server 80 executes the algorithm 92 and performs an image analysis of the authentication image 110. The authentication image 110 may be translated or mapped into a character string 112 and compared to the entries in the enrollment database 100. If the credentials submitted by the authenticating user match the biometric template 104, then the claimed identity of the authenticating user is confirmed or authenticated. In other words, the nullifying biometric 20 described in the authentication image 86 sufficiently or exactly translates to the alphanumeric combination 96.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 9:
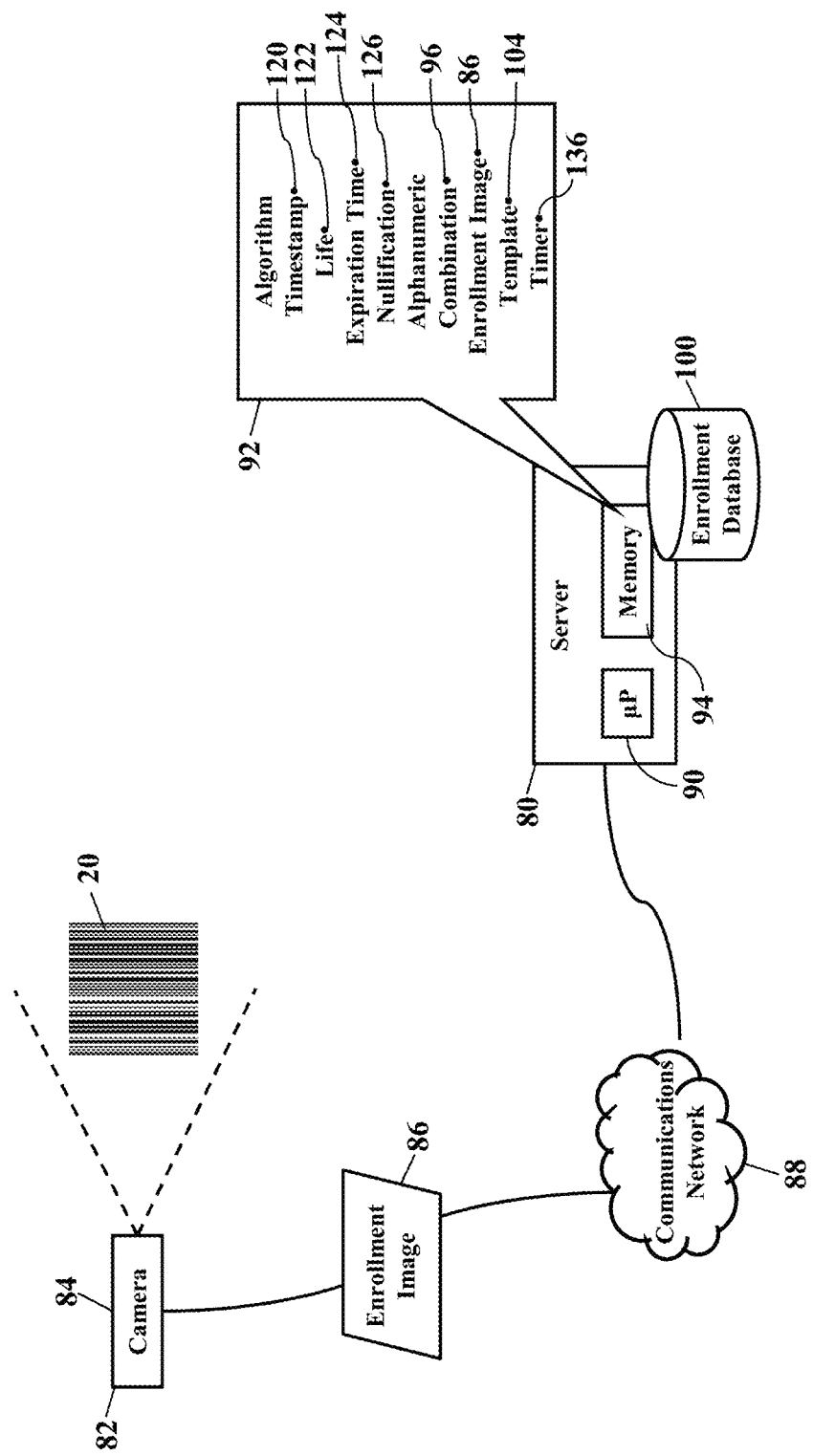

FIGS. 9-10 illustrate automatic expiration of enrollment, according to exemplary embodiments. Here exemplary embodiments may automatically decline any authentication, based on a stale nullifying biometric 20. FIG. 9, for example, illustrates rule-based expirations based on a timestamp 120 associated with the enrollment image 86 of the nullifying biometric 20. The timestamp 120 may be added or determined by the camera 84 generating the enrollment image 86. However, the timestamp 120 may additionally or alternatively be added or determined by the server 80 (such as a date and time of receipt). Regardless, the timestamp 120 marks or defines a beginning of a life 122 associated with the nullifying biometric 20. That is, the enrollment image 86 of the nullifying biometric 20 will only be verifiable or authenticatable during the life 122 that coincides with the natural physiological process associated with the nullifying biometric 20. The life 122, in other words, will have an expiration time 124 that coincides with a nullification 126 of the nullifying biometric 20. FIG. 9 illustrates the electronic enrollment database 100 as being locally stored in the server 80, but some or all of the database entries may be remotely maintained at some other server, device, or location in the communications network 88.

FIG. 10 illustrates electronic database operations. The electronic enrollment database 100 is illustrated as a table 130 that electronically maps, relates, or associates different alphanumeric combinations 96 to different biometric templates 104. For example, an entry may associate the alphanumeric combination 96 to the enrollee's name 132 and address 134. Moreover, the enrollee's template 104 may further include a pointer or filename associated with the enrollment image 86. Exemplary embodiments, in simple words, define electronic database associations between different users and their biometric templates 104 describing their respective nullifying biometrics 20. While FIG. 10 only illustrates a few entries, in practice the enrollment database 100 may contain hundreds, thousands, or even millions of entries for a large number of enrolled users. The server 80 may thus query the enrollment database 100 for any query term (such as the alphanumeric combination 96) and one or more of the corresponding entries.

Biometric enrollment, though, may automatically expire. Exemplary embodiments may automatically cancel or expire any entry in the enrollment database 100. Recall that the nullifying biometric 20 is only a temporary body modification that may disappear or degrade over time. The nullifying biometric 20, in other words, naturally cancels with human physiological growth. At some time, then, a corresponding entry in the enrollment database 100 should expire. After all, if nullifying biometric 20 self-nullifies, the corresponding entry in the enrollment database 100 should no longer be used for authentication. Once the nullifying biometric 20 invalidates itself, any future use of that same nullifying biometric 20 should be rejected.

Exemplary embodiments may thus include the expiration time 124. When the nullifying biometric 20 is initially enrolled in the enrollment database 100, the algorithm 92 may add or store the corresponding timestamp 120. The algorithm 92 may also add an entry describing the corresponding growth rate 40 associated with the nullifying biometric 20. As time passes, the nullifying biometric 20 will have naturally self-canceled, according to the corresponding growth rate 40. The algorithm 92 may thus execute rules or logic that determines or calculates the life 122 of the physical nullifying biometric 20. The life 122 is thus a time during which the template 104 may be used for authentication or verification purposes. At or after the expiration time 124, the algorithm 92 may be prevented from using authenticating the nullifying biometric 20.

Examples help explain the expiration time 124. Recall the nail plate (illustrated as reference numeral 22 in FIGS. 1-2) has an average growth rate 40 of about three millimeters (3 mm) per month. The algorithm 92 may assume that most people will trim their nails after five millimeters (5 mm) of natural growth. The life 122 may thus be determined from $$\frac{5 \text{ mm}}{3 \text{ mm/month}} = 1.67 \text{ months.}$$

The expiration time 124 is thus less than two (2) months, meaning the nullifying biometric 20 will have safely self-canceled two months from the timestamp 120 at initial enrollment. The algorithm 92 may thus add the life 122 to the initial timestamp 120 to determine the expiration time 124. Whenever the algorithm 92 performs an authentication or verification using the nullifying biometric 20, the algorithm 92 may retrieve the current date and time and compare to the expiration time 124. If the current date and time is before the expiration time 124, then the algorithm 92 is permitted to authenticate the corresponding nullifying biometric 20 (e.g., the corresponding alphanumeric combination 96). However, if the current date and time is equal to or after the expiration time 124, then the algorithm 92 may not be permitted to authenticate the nullifying biometric 20. Authentication, in other words, may fail merely based on the passage of time from the timestamp 120 of initial enrollment. Exemplary embodiments may thus reject further use of the nullifying biometric 20 after the expiration time 124.

Another example helps explain the expiration time 124. Recall the QR code 52 laser engraved into the fingerprint 50 may heal at the cellular growth rate 40 (as FIG. 3 illustrated). Assume the QR code 52 is a two dimensional micro-square having dimensions of 3 mm by 3 mm (or 9 mm²). Also assume the cellular growth rate 40 is 0.14 mm per day. The life 122 may thus be determined from $$\frac{9 \text{ mm}^2}{0.14 \text{ mm}^2/\text{day}} = 64.29 \text{ days.}$$

The expiration time 124 is thus less than sixty five (65) days, meaning the nullifying biometric 20 will have safely self-canceled slightly over two months from the timestamp 120 at initial enrollment. If the current time is before the expiration time 124, the algorithm 92 is permitted to authenticate the corresponding nullifying biometric 20 (e.g., the corresponding alphanumeric combination 96). However, if the current time is equal to or after the expiration time 124, then the algorithm 92 may not be permitted to authenticate the nullifying biometric 20, based merely on the passage of time from the initial timestamp 120.

The human hair 72 provides another example. This disclosure previously explained how the nullifying biometric 20 may be chemically dyed onto the hair 72 of the human head xx (as FIGS. 5-6 illustrated). As the hair 72 filaments physiologically grow, the nullifying biometric 20 will thus gradually move and be cut or trimmed away. Research shows that the hair 72 has an average growth rate 40 of about 1.25 centimeters in length per month. Exemplary embodiments may assume that most people will trim their hair after three centimeters (3 cm) of natural growth. The life 122 may thus be determined from $$\frac{3 \text{ cm}}{1.25 \text{ cm/month}} = 2.4 \text{ months.}$$

The expiration time 124 is thus less than three (3) months, implying the nullifying biometric 20 should naturally self-cancel slightly over two months from the timestamp 120 at initial enrollment. If the current date and time predates the expiration time 124, the algorithm 92 is permitted to authenticate the corresponding nullifying biometric 20 (e.g., the corresponding alphanumeric combination 96). However, if the current date and time antedates the expiration time 124, then the algorithm 92 may not be permitted to authenticate the nullifying biometric 20, based merely on the passage of time from the initial timestamp 120.

Biometric authentication may thus be declined based on time. Conventional biometric traits are permanent and do not cancel. Here, though, the nullifying biometric 20 self-nullifies in a relatively short amount of time. As natural physiological processes (whether healing or growth) occur, the nullifying biometric 20 will distort, fade away, and/or be discarded. The enrolling user may then have a new nullifying biometric 20 applied for another short-term interval of use. As a further precaution, though, exemplary embodiments may automatically cancel or expire any entry in the enrollment database 100. If authentication is attempted with a stale nullifying biometric 20 (as determined or measured from the initial timestamp 120), exemplary embodiments may automatically fail the attempted authentication. Once the expiration time 124 elapses, exemplary embodiments thus thwart any nefarious activity.

Exemplary embodiments may also configure a timer 136. Once the life 122 is determined, the algorithm 92 may initialize or start the timer 136. The timer 136 may increment or count from the initial timestamp 120 to the value associated with the life 122. The timer 136, in other words, may start count up from the value of the initial timestamp 120. The timer 136 counts to a final value that equals the timestamp 120 plus the life 122. Once life 122 expires, no further authentications may be attempted using the same nullifying biometric 20.

FIG. 11 further illustrates the enrollment database 100, according to exemplary embodiments. Here the enrollment database 100 may further include entries for a body location 140 of the corresponding nullifying biometric 20. When the nullifying biometric 20 is applied to the user's body, an electronic database entry may be added to describe the body location 140 (such as the nail plate 22 or the fingernail 30, as illustrated with reference to FIGS. 1-2). The entry may include a textual description 142 describing the body location 140. The enrollment database 100 may thus include or define electronic database associations between the alphanumeric combination 96 identifying the nullifying biometric 20, the timestamp 120, the growth rate 40, and the expiration time 124.

Figure 12:
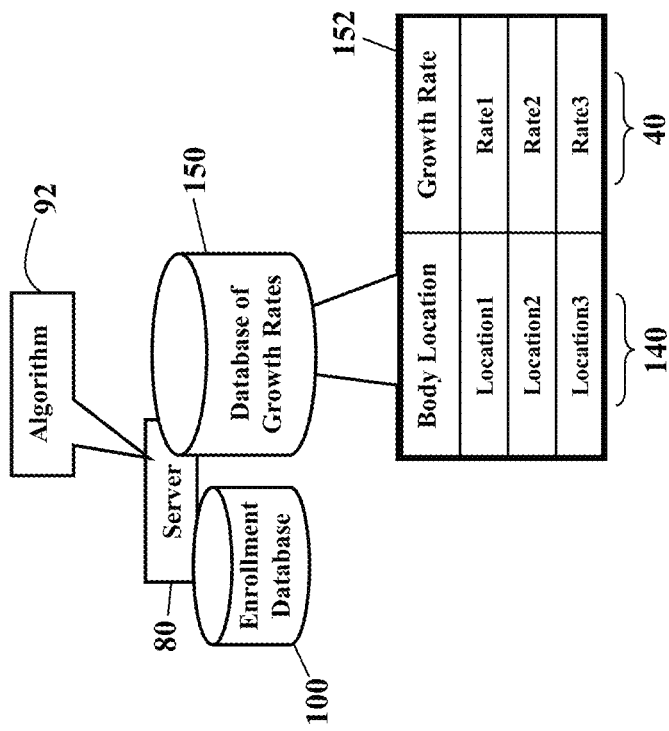
FIG. 12 illustrates an electronic database of growth rates, according to exemplary embodiments.

FIG. 12 illustrates an electronic database 150 of growth rates, according to exemplary embodiments. As the above paragraph explained, the nullifying biometric 20 may be added to or applied to any portion of the human or animal body. Each different body part or area, though, may have a different growth rate 40. Whenever the nullifying biometric 20 is applied to any enrolling user's body, exemplary embodiments may thus consult the electronic database 150 of growth rates for the corresponding growth rate 40. FIG. 12 thus illustrates the electronic database 150 of growth rates as a table 152 that electronically maps, relates, or associates different body locations 140 to different growth rates 40. Once the body location 140 is added to the enrollment database 100 (as explained with reference to FIG. 11), exemplary embodiments may query the electronic database 150 of growth rates for the body location 140 (such as the textual description 142) and retrieve the corresponding growth rate 40. Exemplary embodiments may then copy the entry describing the corresponding growth rate 40 into the corresponding entry in the enrollment database 100. Exemplary embodiments, in other words, may populate the enrollment database 100 with the growth rate 40 retrieved from the electronic database 150 of growth rates. FIG. 12 illustrates the electronic enrollment database 100 as being locally stored in the server 80, but some or all of the database entries may be remotely maintained at some other server, device, or location in the communications network (illustrated as reference numeral 88 in FIGS. 7-9). While FIG. 12 only illustrates a few entries, in practice the enrollment database 100 may contain many entries detailing the growth rates 40 for many different body locations.

Figure 13:
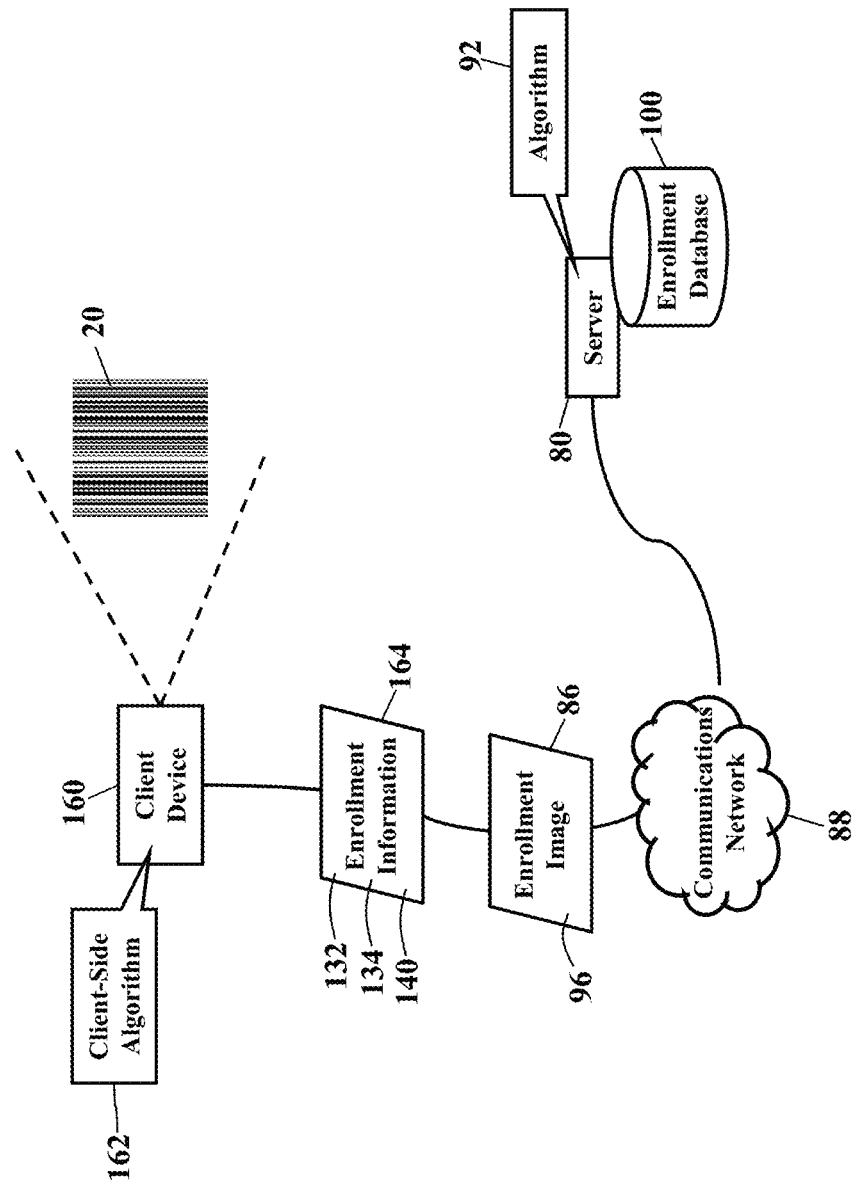
FIGS. 13-14 illustrate a client-server environment, according to exemplary embodiments.
Figure 14:
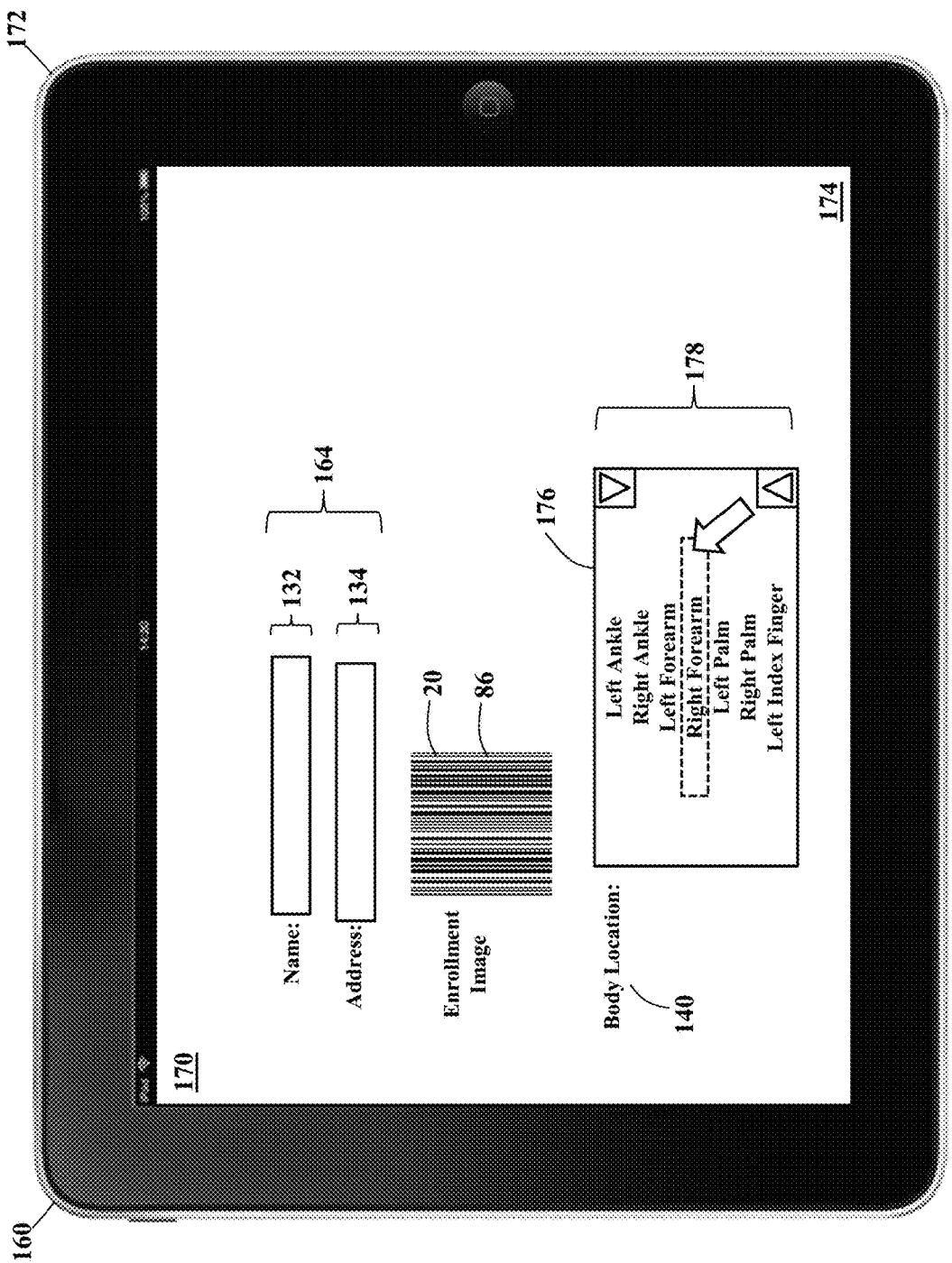

FIGS. 13-14 illustrate a client-server environment, according to exemplary embodiments. Here the enrollment database 100 may be accessed by a client device 160 via the communications network 88. Suppose, for example, the nullifying biometric 20 is applied by a licensed/registered provider (an "enroller"). The provider uses the client device 160 to enroll the nullifying biometric 20 into the enrollment database 100. The client device 160 may store and execute a client-side algorithm 162 that cooperates with the algorithm 92 executed by the server 80. The client device 160 may thus capture and send the enrollment image 86 to the network address associated with the server 80. However, the client device 160 may additionally or alternatively send the alphanumeric combination 96 that represents the enrolling nullifying biometric 20. Regardless, the client device 160 may also send enrollment information 164, such as the enrollee's name 132, address 134, and the body location 140 of the nullifying biometric 20. When the server 80 receives the enrollment image 86, the alphanumeric combination 96, and/or the enrollment information 164, the algorithm 92 instructs the server 80 to populate the enrollment database 100. Exemplary embodiments, in simple words, permit the licensed/registered provider to enroll the nullifying biometric 20 on behalf of the enrolling user. The enrollment image 86, the alphanumeric combination 96, and/or the enrollment information 164 may be sent and received as packets of data according to a packet protocol (such as any of the Internet Protocols). The packets of data contain bits or bytes of data describing the contents, or payload, of a message. A header of each packet of data may contain routing information identifying an origination address and/or a destination address.

FIG. 14 illustrates a graphical user interface 170. Here the client-side algorithm 162 may cause the client device 160 to generate the graphical user interface ("GUI") 170. FIG. 14, for simplicity, illustrates the client device 160 as a tablet computer 172. The client device 160, though, may be any processor-controlled device, as later paragraphs will explain. The table computer 172 generates the graphical user interface 170 for visual display on a display device 174 (such as a touch screen display common on many mobile devices). The graphical user interface 170 has various fields for entering or inputting the enrollment information 164. The graphical user interface 170, in particular, has a data field 176 for specifying the body location 140 of the nullifying biometric 20. FIG. 14, for example, illustrates a menu 178 of body locations from which the provider may select. The menu 178 of body locations presents a listing of different textual descriptions of different body parts. The provider highlights and selects the correct body location 140 (perhaps using a tactile selection or input). The menu 178 of body locations may thus be prepopulated with predefined or approved body locations 140.

Figure 15:
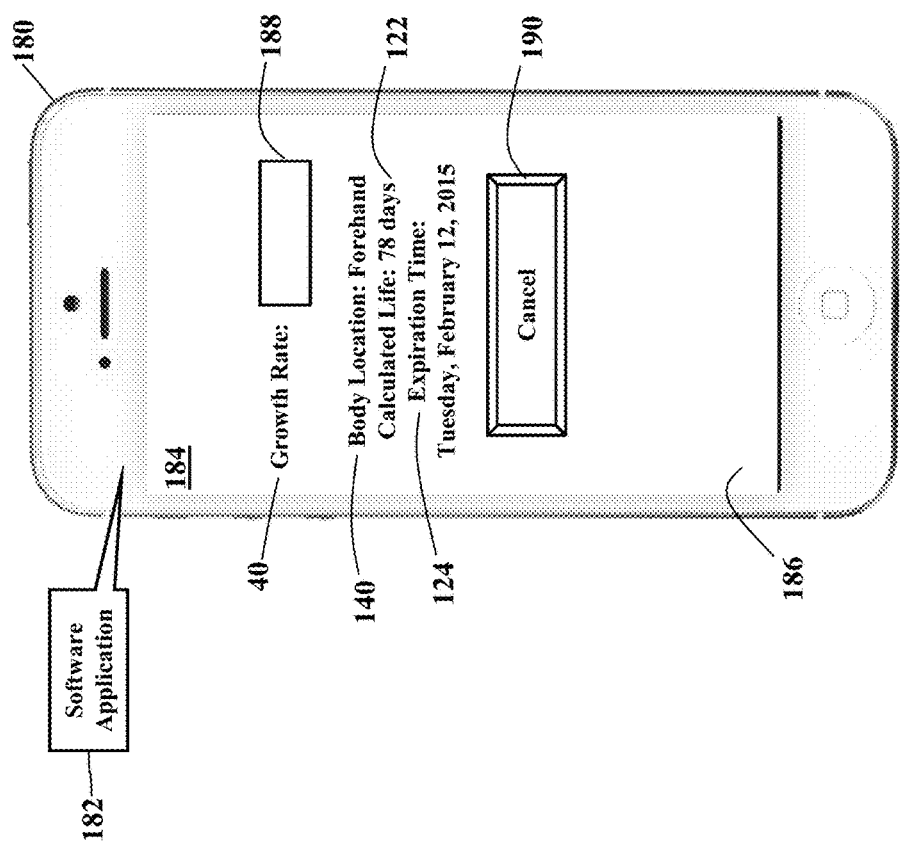
FIGS. 15-16 illustrate personalizations, according to exemplary embodiments.
Figure 16:
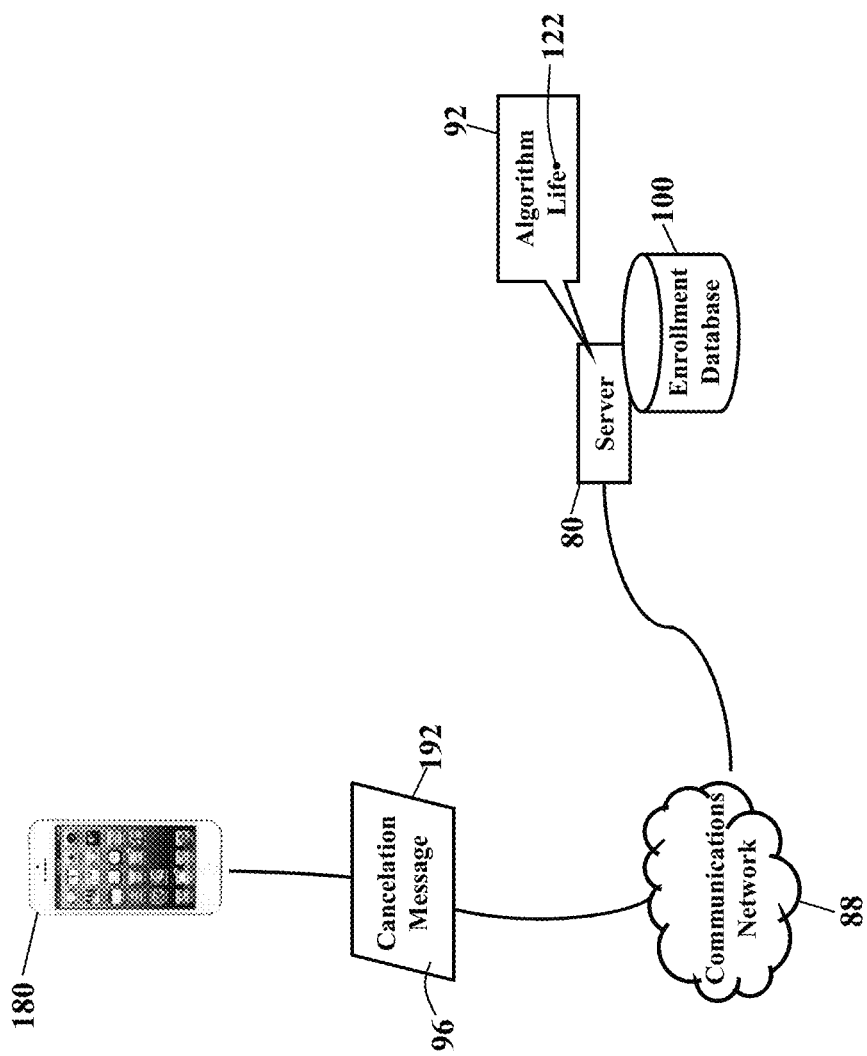

FIGS. 15-16 illustrate personalizations, according to exemplary embodiments. Here exemplary embodiments may allow the enrolling user (or "enrollee") to personalize authentication. As the reader may understand, different users may have different requirements and needs. Some users, for example, may let their fingernails grow, thus extending a time of usage for their corresponding nullifying biometric 20. Some users may have a slower growth rate 40, while other users may have a faster growth rate 40. Here, then, exemplary embodiments may allow the enrollee to self-configure the automatic expiration associated with her nullifying biometric 20.

FIG. 15 illustrates a mobile smartphone 180. The enrollee may use her mobile smartphone 180 to customize or configure her enrollment profile stored in the enrollment database (illustrated as reference numeral 100 in FIGS. 7-11). Suppose the enrollee uses the smartphone 180 to download a software application 182 that interfaces with the server 80 via the communications network 88 (again as FIGS. 7-9 illustrate). The software application 182 is stored in a memory of the smartphone 180, and a processor executes the software application 182. The software application 182 generates a personalization interface 184 that is displayed by the mobile smartphone 180 (such as by a touch screen 186). The personalization interface 184 allows the enrollee to change some or any database entries in the enrollment database 100. For example, the enrollee may personalize the growth rate 40 associated with the body location 140 associated with her nullifying biometric 20. The enrollee may place a cursor into a data field 188 and enter text and/or numerals that define her desired growth rate 40. The enrollee may thus shorten, or extend, the authentication life 122 (e.g., the expiration time 124) of her nullifying biometric 20 merely by adjusting the growth rate 40.

The personalization interface 184 may also include a cancelation control 190. Here the enrollee may simply graphically or tactilely select the cancelation control 190 to immediately, or nearly immediately, cancel the corresponding enrollment of her nullifying biometric 20. Suppose, for example, the enrollee trims her nail plate 22 or cuts her hair 72 (explained with reference to FIGS. 1 and 5-6). The enrollee may thus use her smartphone 180 to cancel her enrollment, thus preventing rogue authorization.

FIG. 16 illustrates a cancelation message 192. When the user selects the cancelation control 190, and electronic cancelation message 192 is generated and sent to the network address associated with the server 80. The cancelation message 192 includes information that identifies the unique alphanumeric combination 96 associated with the enrollee's entries in the enrollment database 100. When the server 80 receives the cancelation message 192, the algorithm 92 obtains the alphanumeric combination 96 and queries the enrollment database 100. The algorithm 92 then automatically expires the life 122 associated with the enrollee's nullifying biometric 20. The cancelation message 192 thus instructs or causes a nearly immediate termination of any authentications using the nullifying biometric 20. Biometric authentication and verification are thus unavailable for that user until a new nullifying biometric 20 is applied to the body.

Figure 17:
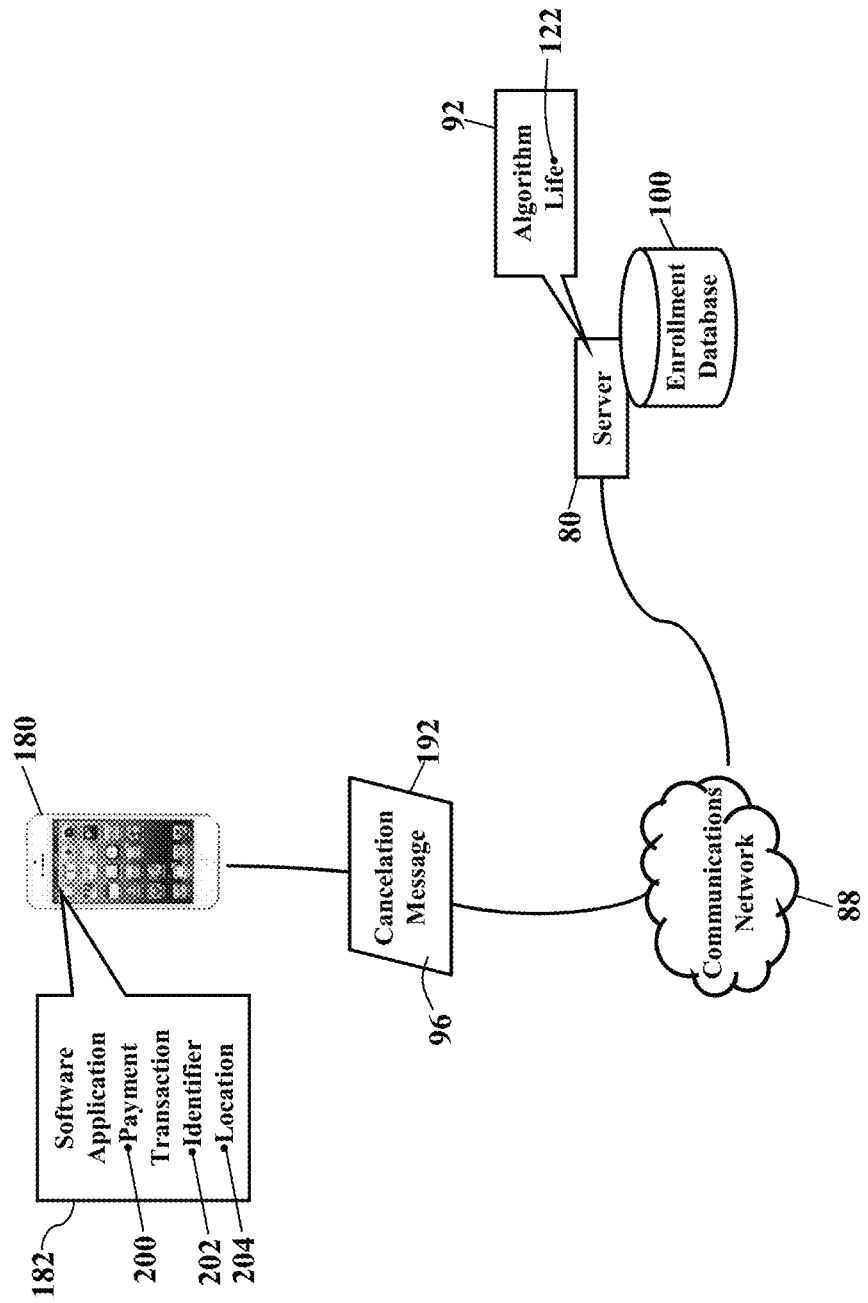
FIG. 17 illustrates transaction-based cancelations, according to exemplary embodiments.

FIG. 17 illustrates transaction-based cancelations, according to exemplary embodiments. Here exemplary embodiments may cancel enrollments, based on predefined transactions. Suppose, for example, the enrollee has her hair cut at a hair salon. If she uses her smartphone 180 to conduct an electronic payment transaction 200, exemplary embodiments may automatically notify and update the enrollment database 100. When the software application 182 detects or is notified of the electronic payment transaction 200, the software application 182 may cause the smartphone 180 to generate and send the cancelation message 192. The cancelation message 192 routes to the network address associated with the server 80. When the server 80 receives the cancelation message 192, the algorithm 92 obtains the alphanumeric combination 96 and automatically expires the corresponding life 122. The cancelation message 192 thus instructs or causes a nearly immediate cancelation or deletion of the corresponding enrollment in the enrollment database 100. Because the enrollee has had her hair cut, further biometric authentication and verification are unavailable until a new enrollment process is completed.

Other security precautions may be implemented. Some users may not want their unique alphanumeric combination 96 stored by or known to their smartphone 180. After all, if the smartphone 180 is stolen or compromised, the alphanumeric combination 96 could be used to quickly authenticate many financial transactions. Exemplary embodiments, then, may alternatively use a telephone number, cellular identifier, and/or IP address to determine the corresponding enrollment profile in the enrollment database 100. For example, the enrollee's profile may be electronically associated with her telephone number, cellular identifier, and/or IP address associated with her smartphone 180. The software application 182 may thus be configured to recognize the electronic payment transaction 200 associated with a service provider, such as a unique identifier 202 associated with the hair salon. The unique identifier 202 may be a textual name, but more likely the identifier 202 is a unique alphanumeric character string defined in the electronic payment transaction 200. When the electronic payment transaction 200 includes or specifies the unique identifier 202, the software application 182 alerts the enrollment database 100 to cancel the enrollee's corresponding enrollment.

Exemplary embodiments may thus automatically cancel based on services. The enrollee may personalize her enrollment with services or service providers, such as nail salons, hair salons, and dermatological skin centers. The software application 182 may monitor electronic payment transactions 200 for these providers. When the corresponding unique identifier 202 is determined, exemplary embodiments may be configured to assume the nullifying biometric 20 has been discarded, mutilated, painted over, or otherwise manually destroyed. The software application 182 may thus instruct the algorithm 92 to fail further authentications involving that same nullifying biometric 20.

Exemplary embodiments may also use location data. As the enrollee carries her smartphone 180, exemplary embodiments may receive or determine a geographic location 204. The smartphone 180, for example, may acquire global positioning system ("GPS") information using a GPS receiver. Exemplary embodiments may thus use the GPS information to determine the smartphone 180 is currently located in a location known to be an authorized service provider (again, such as nail salons, hair salons, and dermatological skin centers). The software application 182 may monitor the smartphone's geographic location 204 and assume the nullifying biometric 20 needs cancelation when the current location matches a known provider's location. The software application 182 may thus instruct the algorithm 92 to fail further authentications involving that same nullifying biometric 20.

Figure 18:
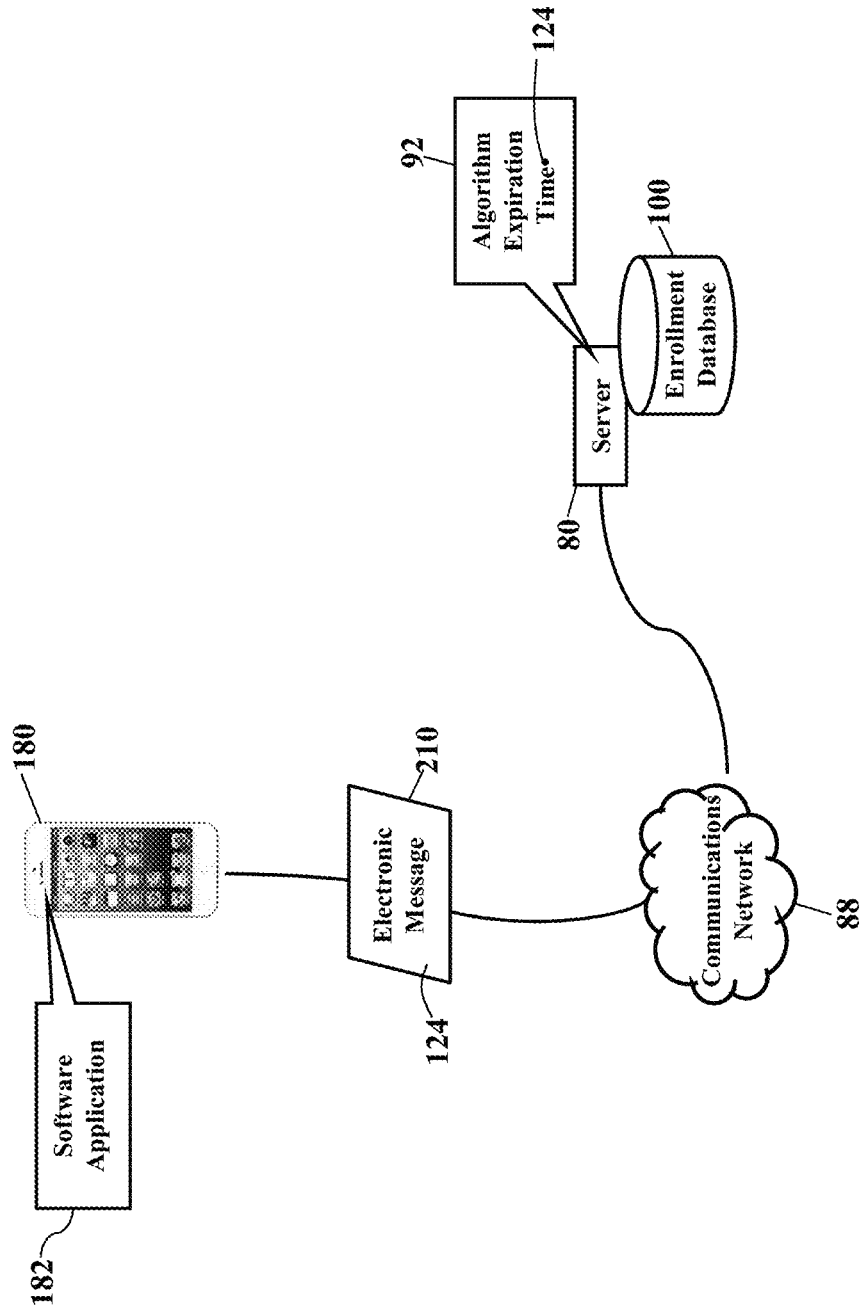
FIG. 18 illustrates notifications of expiration, according to exemplary embodiments.

FIG. 18 illustrates notifications of expiration, according to exemplary embodiments. Here exemplary embodiments may electronically notify the enrollee of a pending expiration. Suppose, for example, the algorithm 92 determines that only five (5) days remain before the expiration time 124 associated with the enrollee's nullifying biometric 20. The algorithm 92 may thus be configured to generate and send an electronic message 210. The electronic message 210 may be an SMS text message, email, website posting, telephone call, or any other electronic notification. FIG. 18 illustrates the electronic message 210 routing to the network address associated with the enrollee's smartphone 180. The electronic message 210, however, may be routed to any address specified in the enrollee's profile in the enrollment database 100. The electronic message 210 includes text, a website link, and/or an audio file that, when executed or processed, informs the enrollee of the pending expiration time 124. The enrollee is thus alerted to update her enrollment profile with a new nullifying biometric 20. The enrollee, in other words, is encouraged to have a new nullifying biometric 20 applied to her body.

Exemplary embodiments may also include recycling, according to exemplary embodiments. That is, exemplary embodiments may reuse nullifying biometrics 20. As the reader may envision, there may only be a limited number of different designs for the nullifying biometric 20. Because each nullifying biometric 20 has a limited life of enrollment, a small set of different designs may adequately service a large population of enrollees. Exemplary embodiments may thus cycle through different nullifying biometrics 20 for each enrollee. Suppose, for example, the set of different designs contains or defines one hundred (100) members. These members may be randomly or sequentially chosen for enrollment with any enrollee. As any nullifying biometric 20 expires, exemplary embodiments may automatically select a different member in the set. In other words, months or years may pass before the nullifying biometric 20 is reused by the same enrollee. Moreover, as enrollments automatically expire based on time, the relatively small set of different designs may serve millions of different enrollees.

Figure 19:
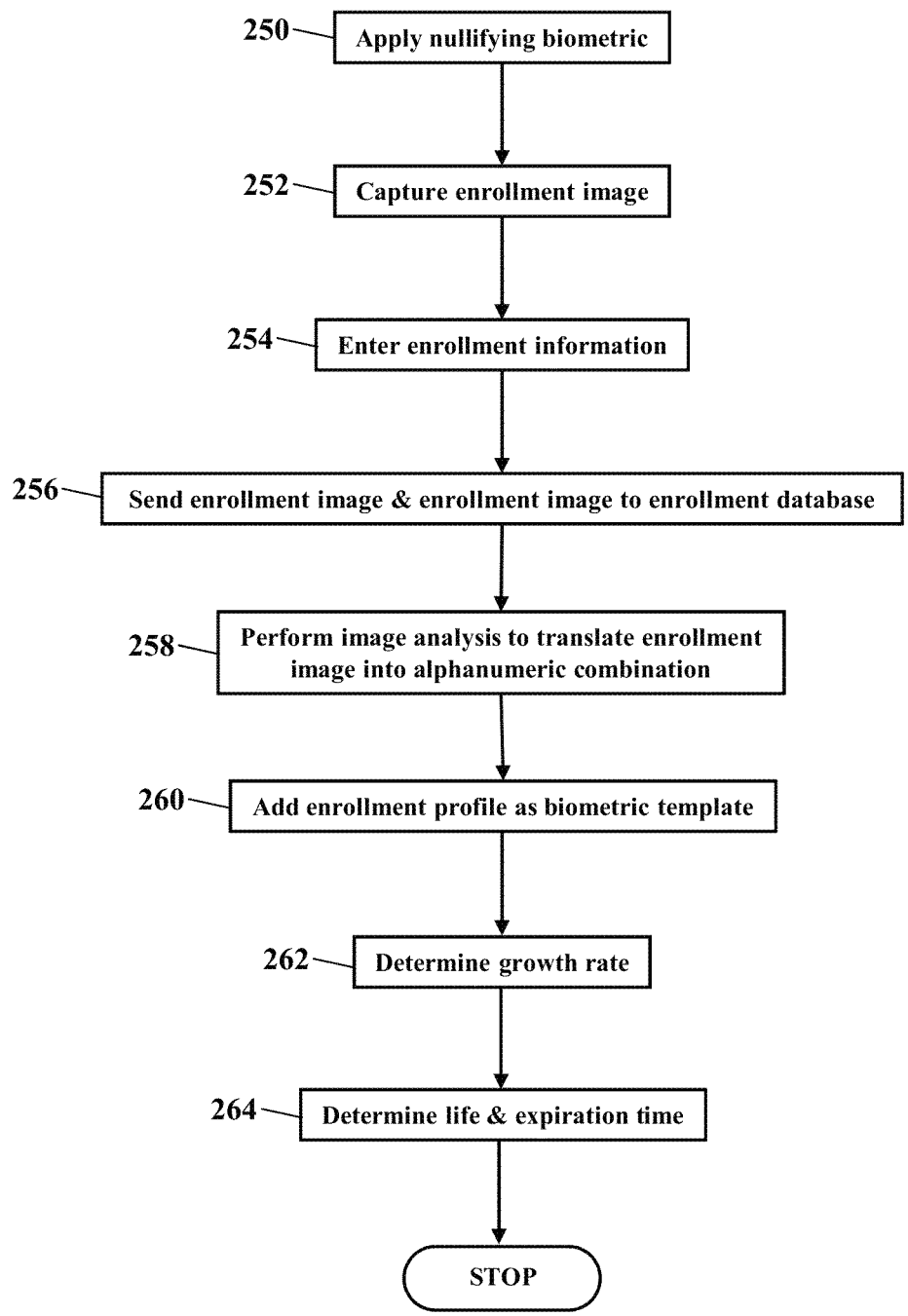
FIGS. 19-20 are flowcharts illustrating methods for enrolling and authenticating the nullifying biometric, according to exemplary embodiments.

FIG. 19 is a flowchart illustrating a method for enrolling the nullifying biometric 20, according to exemplary embodiments. The nullifying biometric 20 is applied to the enrollee's body (Block 250). The enrollment image 86 of the nullifying biometric 20 is captured (Block 252). The enrollment information 164 is entered (Block 254). The enrollment image 86 and the enrollment information 164 are sent to the enrollment database 100 (Block 256). Image analysis is performed to translate the enrollment image 86 into the unique alphanumeric combination 96 (Block 258). The enrollment profile 124 is added to the enrollment database 100 as the biometric template 104 (Block 260). The growth rate 40 is determined (Block 262). The life 122 and the expiration time 124 of the nullifying biometric 20 are determined (Block 264).

Figure 20:
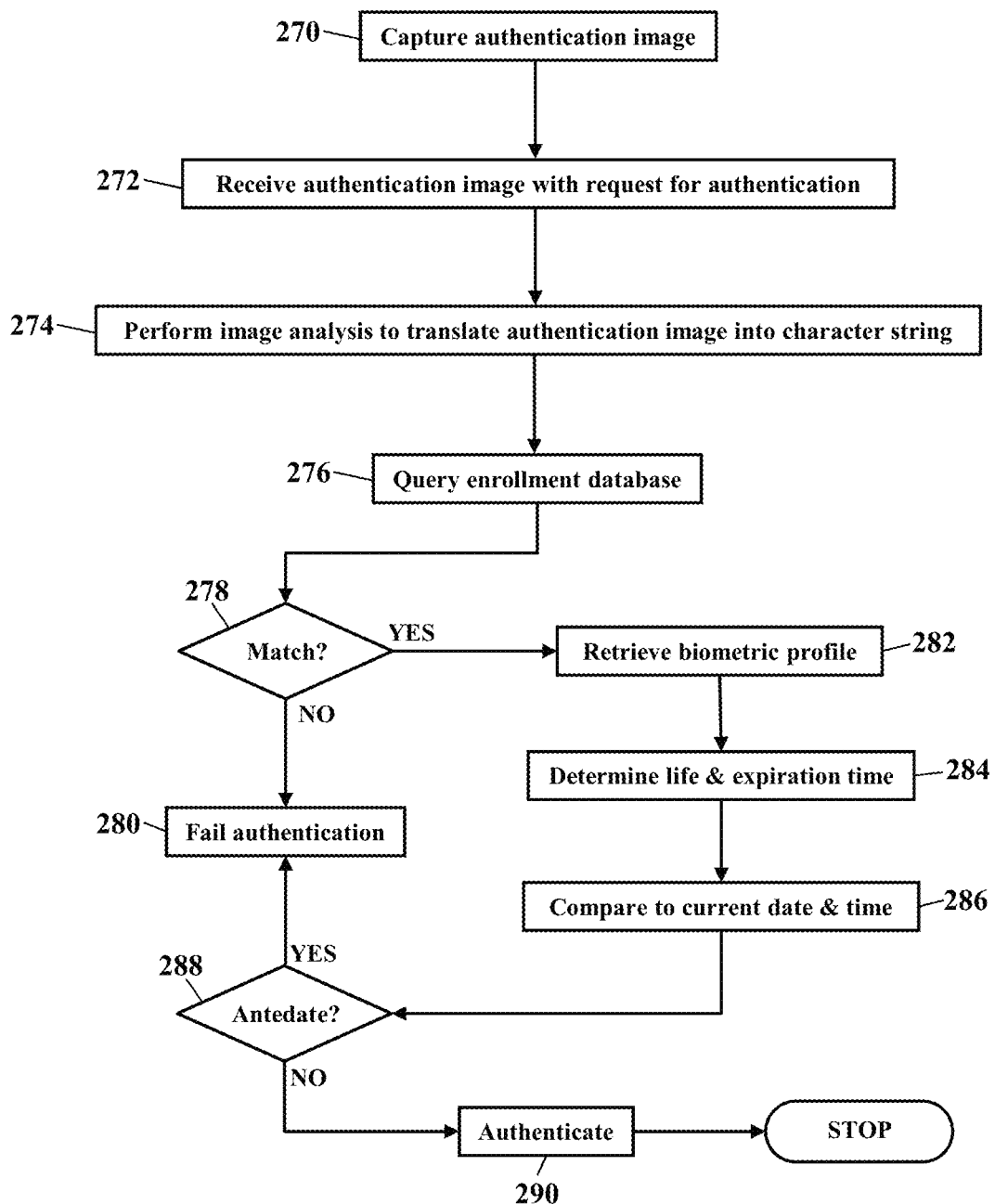

FIG. 20 is a flowchart illustrating a method for authenticating and verifying an identity, according to exemplary embodiments. The authentication image 110 is captured (Block 270). The server 80 receives the authentication image 110 with an electronic request for authentication (Block 272). Image analysis is performed to translate the authentication image 110 into the character string 112 (Block 274). The enrollment database 100 is queried for the character string 112 (Block 276). If no match is determined (Block 278), authentication fails (Block 280). However, if a match is determined (Block 278), the corresponding biometric profile 124 is retrieved (Block 282). The life 122 and the expiration time 124 are determined (Block 284) and compared to a current date and time (Block 286). If the authentication antedates (Block 288), authentication fails (Block 280). If authentication predates (Block 288), authentication may approve (Block 290).

Figure 21:
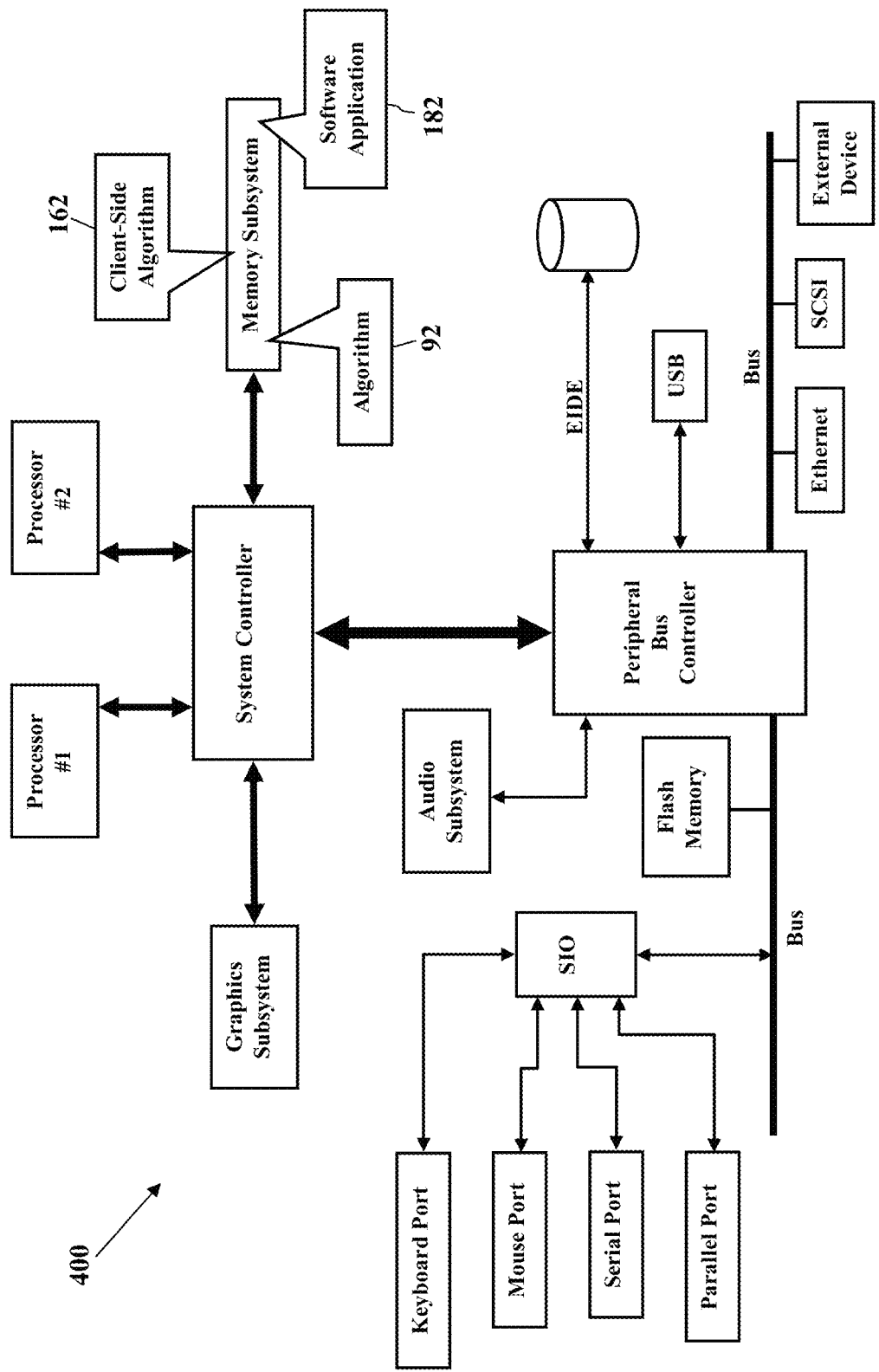

FIG. 21 is a schematic illustrating still more exemplary embodiments. FIG. 21 is a more detailed diagram illustrating a processor-controlled device 400. As earlier paragraphs explained, the algorithm 92, the client-side algorithm 162, and/or the software application 182 may partially or entirely operate in any mobile or stationary processor-controlled device. FIG. 21, then, illustrates the algorithm 92, the client-side algorithm 162, and/or the software application 182 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 22:
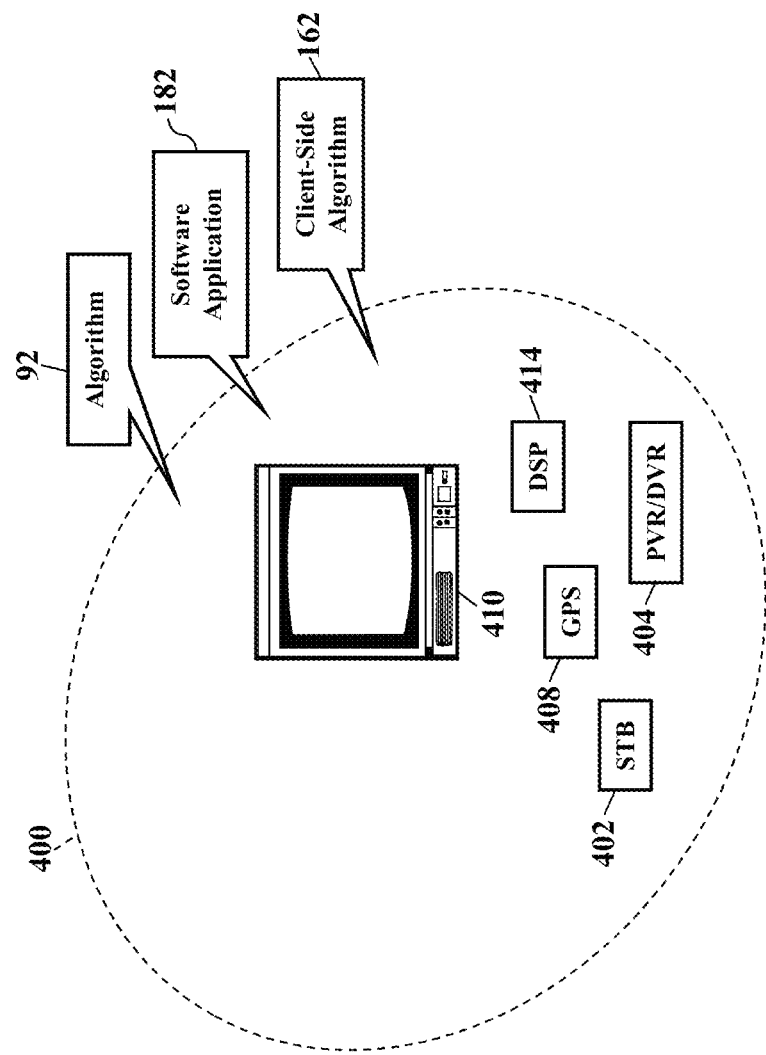

FIG. 22 depicts other possible operating environments for additional aspects of the exemplary embodiments. FIG. 22 illustrates the algorithm 92, the client-side algorithm 162, and/or the software application 182 operating within various other processor-controlled devices 400. FIG. 22, for example, illustrates that the algorithm 92, the client-side algorithm 162, and/or the software application 182 may entirely or partially operate within a set-top box ("STB") (402), a personal/digital video recorder (PVR/DVR) 404, a Global Positioning System (GPS) device 408, an interactive television 410, or any computer system, communications device, or processor-controlled device utilizing any of the processors above described and/or a digital signal processor (DP/DSP) 414. Moreover, the processor-controlled device 400 may also include wearable devices (such as watches), radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Figure 23:
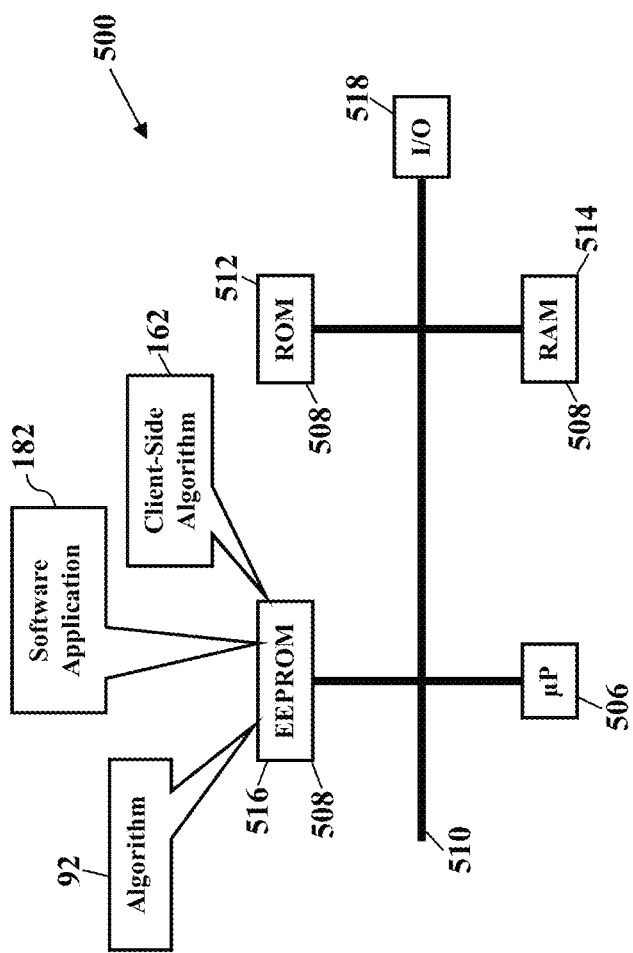

FIGS. 23-26 are schematics further illustrating operating environments for additional aspects of the exemplary embodiments. FIG. 23 is a block diagram of a Subscriber Identity Module 500, while FIGS. 24 and 25 illustrate, respectively, the Subscriber Identity Module 500 embodied in a plug 502 and in a card 504. As those of ordinary skill in the art recognize, the Subscriber Identity Module 500 may be used in conjunction with many communications devices (such as the client device 160 and the mobile smartphone 180). The Subscriber Identity Module 500 stores user information (such as the user's International Mobile Subscriber Identity, the user's $K_i$ number, and other user information) and any portion of the algorithm 92, the client-side algorithm 162, and/or the software application 182. As those of ordinary skill in the art also recognize, the plug 502 and the card 504 each may physically or wirelessly interface with the mobile tablet computer 26 and the smartphone 412.

FIG. 23 is a block diagram of the Subscriber Identity Module 500, whether embodied as the plug 502 of FIG. 24 or as the card 504 of FIG. 25. Here the Subscriber Identity Module 500 comprises a microprocessor 506 (μP) communicating with memory modules 508 via a data bus 510. The memory modules 508 may include Read Only Memory (ROM) 512, Random Access Memory (RAM) and or flash memory 514, and Electrically Erasable-Programmable Read Only Memory (EEPROM) 516. The Subscriber Identity Module 500 stores some or all of the algorithm 92, the client-side algorithm 162, and/or the software application 182 in one or more of the memory modules 508. FIG. 23 shows the algorithm 92, the client-side algorithm 162, and/or the software application 182 residing in the Erasable-Programmable Read Only Memory 516, yet either module may alternatively or additionally reside in the Read Only Memory 512 and/or the Random Access/Flash Memory 514. An Input/Output module 518 handles communication between the Subscriber Identity Module 500 and the communications device. Because Subscriber Identity Modules are well known in the art, this patent will not further discuss the operation and the physical/memory structure of the Subscriber Identity Module 500.

Figure 26:
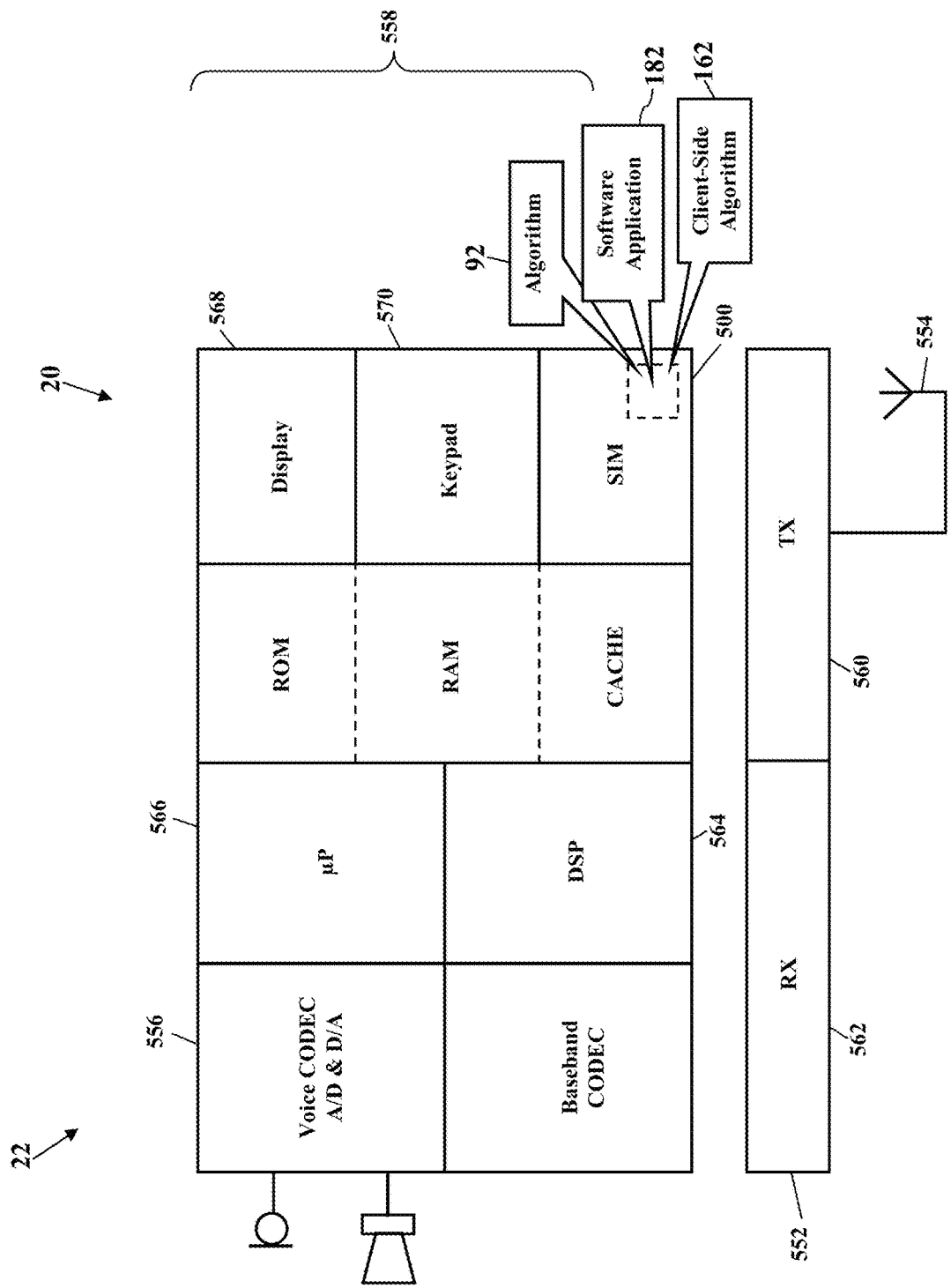

FIG. 26 is a schematic further illustrating the operating environment, according to exemplary embodiments. FIG. 26 is a block diagram illustrating some componentry of the server 80, the client device 160, and/or the mobile smartphone 180. The componentry may include one or more radio transceiver units 552, an antenna 554, a digital baseband chipset 556, and a man/machine interface (MMI) 558. The transceiver unit 552 includes transmitter circuitry 560 and receiver circuitry 562 for receiving and transmitting radio-frequency (RF) signals. The transceiver unit 552 couples to the antenna 554 for converting electrical current to and from electromagnetic waves. The digital baseband chipset 556 contains a digital signal processor (DSP) 564 and performs signal processing functions for audio (voice) signals and RF signals. As FIG. 26 shows, the digital baseband chipset 556 may also include an on-board microprocessor 566 that interacts with the man/machine interface (MMI) 558. The man/machine interface (MMI) 558 may comprise a display device 568, a keypad 570, and the Subscriber Identity Module 500. The on-board microprocessor 566 may also interface with the Subscriber Identity Module 500 and with the algorithm 92, the client-side algorithm 162, and/or the software application 182.

Exemplary embodiments may be applied to any signaling standard. As those of ordinary skill in the art recognize, FIGS. 23-26 may illustrate a Global System for Mobile (GSM) communications device. That is, exemplary embodiments may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for self-nullifying biometrics, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
a processor; and
a memory device, the memory device storing instructions, the instructions when executed causing the processor to perform operations, the operations comprising:
receiving a digital image of a nullifying artificial biometric;
determining that the nullifying artificial biometric is associated with a self-nullification that occurs after an expiration of a time;
processing an authentication prior to the expiration of the time, the authentication based on the digital image of the nullifying artificial biometric; and
failing the authentication after the self-nullification of the nullifying artificial biometric at the expiration of the time.

2. The system of claim 1, wherein the operations further comprise electronically mapping the digital image of the nullifying artificial biometric to an alphanumeric combination.

3. The system of claim 2, wherein the operations further comprise querying an electronic database for the alphanumeric combination, the electronic database electronically associating alphanumeric combinations and growth rates.

4. The system of claim 3, wherein the operations further comprise identifying a growth rate of the growth rates in the electronic database, the growth rate electronically associated in the electronic database with the alphanumeric combination.

5. The system of claim 4, wherein the operations further comprise determining the expiration of the time based on the growth rate.

6. The system of claim 3, wherein the operations further comprise identifying a physiological life associated with the nullifying artificial biometric that is electronically associated in the electronic database with the alphanumeric combination.

7. The system of claim 2, wherein the operations further comprise retrieving a timestamp associated with the alphanumeric combination.

8. A method, comprising:
- receiving, by a server, a digital image of a nullifying artificial biometric for an authentication;
- determining, by the server, an enrollment profile based on the digital image of the nullifying artificial biometric;
- retrieving, by the server, a growth rate associated with the enrollment profile;
- determining, by the server, that the nullifying artificial biometric is associated with a self-nullification that occurs after an expiration of a physiological life based on the growth rate;
- processing, by the server, the authentication prior to the self-nullification of the nullifying artificial biometric; and
- failing, by the server, the authentication after the self-nullification of the nullifying artificial biometric at the expiration of the physiological life.

9. The method of claim 8, further comprising electronically mapping the digital image of the nullifying artificial biometric to an alphanumeric combination.

10. The method of claim 9, further comprising:
- querying an electronic database for the alphanumeric combination, the electronic database electronically associating alphanumeric combinations and growth rates including the growth rate associated with the enrollment profile; and
- identifying the growth rate in the electronic database that is electronically associated with the alphanumeric combination.

11. The method of claim 8, further comprising retrieving a timestamp associated with the enrollment profile.

12. The method of claim 11, further comprising determining the physiological life associated with the nullifying artificial biometric from the timestamp.

13. The method of claim 8, further comprising canceling the enrollment profile after the self-nullification of the nullifying artificial biometric.

14. The method of claim 8, further comprising sending an electronic message prior to the self-nullification, the electronic message notifying of the expiration of the physiological life.

15. A memory device storing instructions that when executed cause a processor to perform operations, the operations comprising:
- receiving a digital image of a nullifying artificial biometric submitted for an authentication;
- determining an enrollment profile based on the digital image of the nullifying artificial biometric;
- retrieving a growth rate associated with the enrollment profile;
- calculating a physiological life associated with the nullifying artificial biometric, the physiological life based on the growth rate;
- determining that the nullifying artificial biometric is associated with a self-nullification that occurs after an expiration of the physiological life based on the growth rate;
- processing the authentication prior to the self-nullification of the nullifying artificial biometric; and
- failing the authentication after the self-nullification of the nullifying artificial biometric at the expiration of the physiological life.

16. The memory device of claim 15, wherein the operations further comprise electronically mapping the digital image of the nullifying artificial biometric to an alphanumeric combination.

17. The memory device of claim 16, wherein the operations further comprise:
- querying an electronic database for the alphanumeric combination, the electronic database electronically associating alphanumeric combinations and growth rates including the growth rate associated with the enrollment profile; and
- identifying the growth rate in the electronic database that is electronically associated with the alphanumeric combination.

18. The memory device of claim 15, wherein the operations further comprise retrieving a timestamp associated with the enrollment profile.

19. The memory device of claim 18, wherein the operations further comprise determining the physiological life associated with the nullifying artificial biometric from the timestamp.

20. The memory device of claim 15, wherein the operations further comprise canceling the enrollment profile after the self-nullification of the nullifying artificial biometric.

* * * * *